US012047341B2

(12) United States Patent
Yang

(10) Patent No.: US 12,047,341 B2
(45) Date of Patent: Jul. 23, 2024

(54) EFFICIENT PROCESSING OF UNREAD MESSAGES

(71) Applicant: Alibaba Group Holding Limited, George Town (KY)

(72) Inventor: Weiwei Yang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 16/945,496

(22) Filed: Jul. 31, 2020

(65) Prior Publication Data

US 2020/0396191 A1    Dec. 17, 2020

Related U.S. Application Data

(63) Continuation-in-part of application No. PCT/CN2019/073392, filed on Jan. 28, 2019.

(30) Foreign Application Priority Data

Feb. 7, 2018  (CN) .......................... 201810122863.4

(51) Int. Cl.
*H04L 51/216* (2022.01)
*H04L 51/42* (2022.01)
(52) U.S. Cl.
CPC ............ *H04L 51/216* (2022.05); *H04L 51/42* (2022.05)
(58) Field of Classification Search
None
See application file for complete search history.

(56) References Cited

U.S. PATENT DOCUMENTS

| 8,412,788 | B2 | 4/2013 | Hardy |
| 8,935,618 | B2 | 1/2015 | Zhang |
| 9,015,257 | B2 | 4/2015 | Buchheit |
| 9,124,543 | B2 | 9/2015 | Buchheit |
| 9,300,617 | B2 | 3/2016 | Hallerström SjöStedt |
| 9,602,456 | B2 | 3/2017 | Buchheit |
| 9,729,485 | B2 | 8/2017 | McCann |
| 9,734,216 | B2 | 8/2017 | Buchheit |
| 9,781,249 | B2 | 10/2017 | Peng |
| 10,083,234 | B2 | 9/2018 | Maharajh |
| 10,345,992 | B2 | 7/2019 | Hwang |

(Continued)

FOREIGN PATENT DOCUMENTS

| CN | 101883186 | 11/2010 |
| CN | 104598476 | 5/2015 |

(Continued)

OTHER PUBLICATIONS

Rambow et al: "Summarizing email threads", May 2, 2004; 1077952576-1077952576, May 2, 2004 (May 2, 2004), pp. 105-108, XP058314033, DOI: 10.3115/1613984.1614011, ISBN: 978-1-932432-24-4.

*Primary Examiner* — Tonia L Dollinger
*Assistant Examiner* — Ishrat Rashid
(74) *Attorney, Agent, or Firm* — Van Pelt, Yi & James LLP

(57) ABSTRACT

Efficiently processing unread messages is disclosed, including: determining a set of unread messages corresponding to a designated object; generating a summary message content based at least in part on the set of unread messages, wherein a summary message content size of the summary message content is less than an unread messages size of the set of unread messages; and presenting the summary message content at a user interface.

17 Claims, 14 Drawing Sheets

(56) References Cited

U.S. PATENT DOCUMENTS

| | | | |
|---|---|---|---|
| 2004/0260756 A1* | 12/2004 | Forstall | G06Q 10/107 709/200 |
| 2005/0038863 A1 | 2/2005 | Onyon | |
| 2005/0223063 A1* | 10/2005 | Chang | G06Q 10/10 715/221 |
| 2005/0262214 A1* | 11/2005 | Bagga | G06Q 10/107 709/207 |
| 2008/0201664 A1* | 8/2008 | O | G06F 3/04817 715/835 |
| 2009/0287780 A1* | 11/2009 | Gawor | H04L 51/00 709/206 |
| 2012/0117161 A1 | 5/2012 | Best | |
| 2014/0245178 A1* | 8/2014 | Smith | H04L 51/216 715/753 |
| 2014/0344711 A1* | 11/2014 | Hallerstrom Sjostedt | H04L 51/22 715/752 |
| 2015/0177970 A1* | 6/2015 | Choi | H04L 51/224 715/752 |
| 2016/0147387 A1 | 5/2016 | Rahman | |
| 2016/0191453 A1* | 6/2016 | Thomas | H04L 51/38 709/206 |
| 2017/0075520 A1 | 3/2017 | Bauer | |
| 2018/0253659 A1* | 9/2018 | Lee | H04L 51/42 |
| 2018/0278563 A1* | 9/2018 | Frost | H04L 51/52 |
| 2021/0278955 A1* | 9/2021 | Lee | H04M 1/72403 |

FOREIGN PATENT DOCUMENTS

| | | | |
|---|---|---|---|
| CN | 105721668 | | 6/2016 |
| CN | 107005613 | | 8/2017 |
| CN | 111555960 A | * | 8/2020 |
| WO | 2018027551 | | 2/2018 |

* cited by examiner

EFFICIENT PROCESSING OF UNREAD MESSAGES

CROSS REFERENCE TO OTHER APPLICATIONS

This application is a continuation-in-part of and claims priority to International (PCT) Application No. PCT/CN2019/73392, entitled MESSAGE PROCESSING METHOD, UNREAD MESSAGE DISPLAY METHOD AND COMPUTER TERMINAL filed on Jan. 28, 2019, which is incorporated herein by reference in its entirety for all purposes, which claims priority to China Patent Application No. 201810122863.4, entitled MESSAGE PROCESSING METHOD, UNREAD MESSAGE DISPLAY METHOD AND COMPUTER TERMINAL filed on Feb. 7, 2018 which is incorporated by reference in its entirety for all purposes.

FIELD OF THE INVENTION

The present application relates to a field of communication technology. In particular, the present application relates to techniques of efficiently processing unread messages.

BACKGROUND OF THE INVENTION

As communication technologies develop, an ever-increasing number of users choose to use instant communication tools (e.g., QQ or WeChat) to communicate with others. However, it is worth noting that existing instant communication tools still suffer from some defects. For example, after participating in a conference, a user may turn on his or her phone and find many unread messages, both in group and single chat messages, displayed by a messaging platform (e.g., WeChat Work). Moreover, there may already be more than 99 messages in each group, in which the dialog box corresponding to the group may display " . . . " In this situation, the user is very likely to wonder whether he should open and view the unread messages or simply ignore them. He might think, "Does this information in the group chat dialog actually concern me?" He might also think, "Does this information actually need to be processed now? How urgent is it?" The overwhelming number of unread messages may be inconvenient for the user to digest and as a result, the user may not read them in a timely fashion.

To solve the problem described above, the prior art has the solutions including the following: In a first example prior art solution, the information regarding the unread messages is presented on the locked screen of the device and the user is permitted to directly rightward swipe to reply to the unread messages. However, the following describes a drawback to this solution: It is not possible for the user to digest the main content of the multiple unread messages when multiple pieces of group or individual chat content are replied to at once. For example, with regard to multiple messages in a group chat, it is not at all clear what the content is and who the senders are. Thus, it is not possible for the user to quickly assess whether further operations are appropriate to perform on the unread messages. In a second example prior art solution, keywords are input in the chat interface to search for key content. However, the drawback to this solution is that it requires the user to take the initiative in searching for and inputting keywords. Such behavior is a type of active user operation, which is relatively inefficient. Clearly, the prior art solutions described above still cannot effectively solve the problem of inefficient processing of unread messages by a user in the process of using an instant messaging tool. As such, no effective solution has yet been put forward to address the problem described above.

SUMMARY OF THE INVENTION

The present application discloses techniques comprising:
determining a set of unread messages corresponding to a designated object;
generating a summary message content based at least in part on the set of unread messages, wherein a first size of the summary content is less than a second size of the set of unread messages; and
presenting the summary message content at a user interface.

BRIEF DESCRIPTION OF THE DRAWINGS

Various embodiments of the invention are disclosed in the following detailed description and the accompanying drawings.

The drawings described here are intended to further the understanding of the present application and form a part of the present application. The illustrative embodiments of the present application and the descriptions thereof are intended to explain the present application and do not constitute inappropriate limitation to the present application. Among the drawings.

DETAILED DESCRIPTION

Figure 1:
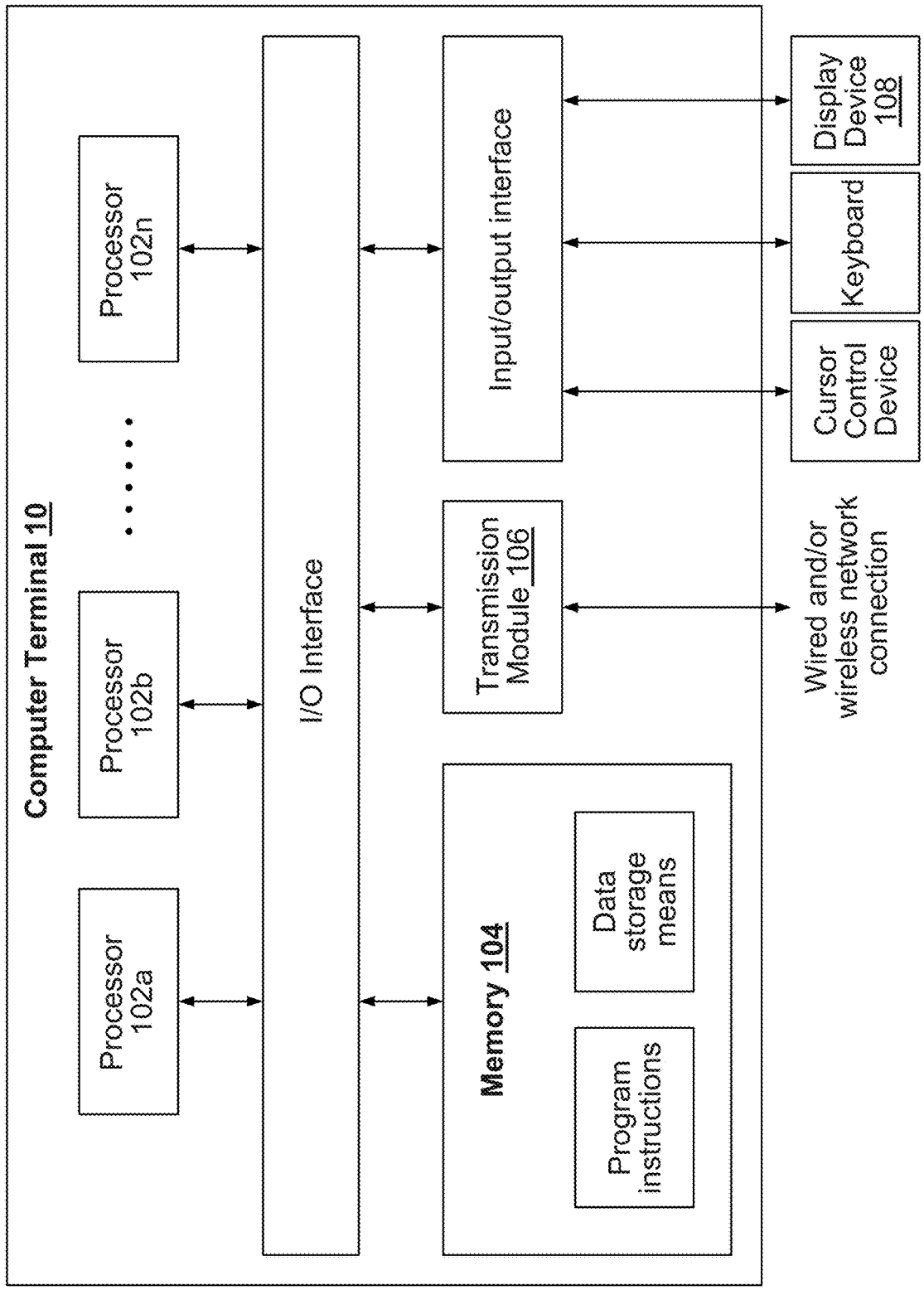
FIG. 1 is a diagram showing an embodiment of a computer terminal that is configured to efficiently process unread messages.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to give persons skilled in the art a better understanding of the present application, technical schemes in embodiments of the present application are described clearly and completely in light of the drawings of the embodiments of the present application. Obviously, the embodiments described are merely some of the embodiments of the present application and are not all the embodiments. So long as no additional creative effort is expended, all other embodiments that are obtained by persons with ordinary skill in the art on the basis of embodiments in the present application shall fall within the scope of protection of the present application.

Please understand that the terms "first," "second," etc. in the description, claims, and drawings of the present application are used to differentiate similar objects and are not necessarily used to describe their particular sequence or order. It should be understood that data used in this way may be switched as appropriate. Thus, embodiments of the present application described herein can be implemented in sequences other than those shown or described herein. In addition, the terms "comprise" and "have" and the variations thereof are meant to be non-exclusive. For example, a process, method, system, product, or device containing a series of steps or units need not be limited to those steps or units that are clearly listed, but may comprise other steps or units that are not clearly listed or that are intrinsic to these processes, methods, products, or devices.

First of all, some of the terms that will appear in the process of describing embodiments of the present application are applied as explained below:

Neuro-linguistic programming (NLP): This belongs to fields in computer science and phonetics that focus on computer-human speech conversion. It is also translated as body-mind grammar programming or natural language processing. It refers to, for example, programmatically analyzing human provided text.

WeChat Work: This refers to a specific example of a business collaboration tool that may be used by employees of an enterprise. Having arisen on a WeChat foundation, its main advantages are its instant communication features.

Dialog box: In a graphic user interface, the dialog box is a special window (e.g., an interactive element) for displaying information to the user in the user interface and/or for acquiring user input responses when appropriate, resulting in a dialog between the device and the user. For example, the dialog box may present to the user some information and/or request input from the user.

Embodiments of efficiently processing unread messages are described herein. Please note that the steps depicted in the flowcharts in the drawings can be executed in a computer system, such as a group of computers capable of executing commands. Moreover, although logical sequences are depicted in the flowcharts, the steps that are depicted or described may, in some situations, be executed in sequences other than those presented here.

FIG. 1 is a diagram showing an embodiment of a computer terminal that is configured to efficiently process unread messages. For example, computer terminal 10 is a mobile device, a tablet, a laptop computer, a desktop computer, and/or any networked device. For descriptive purposes, the depicted structure is only one example of a suitable environment and does not impose any limit on the use, scope, or functions of the present application.

As shown in FIG. 1, computer terminal 10 (e.g., a mobile device) may comprise one or more (indicated by 102a, 102b, . . . , 102n in the drawing) processors 102 (processors 102 may include, but are not limited to, processing means such as microprocessors (MCU) or programmable logic devices (FPGA)), memory 104 for storing data, and transmission module 106 for communication functions. In addition, computer terminal 10 may further comprise: a display device, input/output interfaces (I/O interfaces), a universal serial bus (USB) port (may be included as a port among the I/O interfaces), a network interface, a power supply, and/or a camera. A person with ordinary skill in the art can understand that the structure shown in FIG. 1 is illustrative and does not impose restrictions on the structures of the electronic devices described above. For example, computer terminal 10 may further comprise more or fewer components than are shown in FIG. 1 or have a configuration different from the one shown in FIG. 1.

Please note that one or more processors 102 and/or other data processing circuits may generally be referred to as "data processing circuits" in this document. All or part of the data processing circuits may be embodied as software, hardware, firmware, or any combination thereof. In addition, a data processing circuit can be a single, independent processing module or any of the other components that are fully or partially integrated with computer terminal 10 (or mobile device). The data processing circuits touched upon in embodiments of the present application serve as a kind of processor control (e.g., selection of variable resistance terminal paths for connecting to interfaces).

Memory 104 is configured to store application (sometimes referred to "app") software programs and modules, such as program instructions/data storage means corresponding to unread message display methods in embodiments of the present application. By running software programs and modules stored in memory 104, processor(s) 102 execute various functional apps and data processing. That is, they implement unread message display techniques of applications as described above. Memory 104 may comprise high-speed random-access memory. Memory 104 may further comprise non-volatile memory, such as one or more magnetic storage devices, flash memory, or other non-volatile solid-state memory. In some embodiments, memory 104 may further comprise memory that is remotely disposed relative to processor(s) 102. Such remote memory may be connected to computer terminal 10 via a network. Examples of the network described above include, but are not limited to, the Internet, corporate intranets, local area networks, mobile communication networks, and combinations thereof.

Transmission means 106 is configured to receive or send data via a network. Specific examples of the network may comprise wireless networks provided by communication suppliers for computer terminal 10. In an embodiment, transmission means 106 comprises a network interface controller (NIC), which can connect to other networks via a base station and thereby communicate with the Internet. In an example, transmission means 106 may be a radio frequency (RF) module, which is for communicating with the Internet wirelessly.

Display device 108 can, for example, be a touch-screen liquid crystal display (LCD). This liquid crystal display can enable the user to interact with the user interface of computer terminal 10 (e.g., mobile device).

In some embodiments, computer terminal 10 shown in FIG. 1 described above has a touch display device (also called a "touchscreen" or a "touch display screen"). In some embodiments, computer terminal 10 shown in FIG. 1 described above has a graphical user interface (GUI). The user may engage in human-machine interactions with the GUI by finger contact and/or gestures touching the touch-sensitive surface. The human-machine interaction functions here optionally include the following interactions: communication interfacing, receiving emails, call interfacing, creating a web page, drawing, text processing, producing an electronic document, gaming, videoconferencing, playing digital video, playing digital audio, and/or Internet browsing. The executable instructions for executing the human-machine interaction functions described above are configured/stored in computer program products executable by one or more processors or in readable storage media.

An embodiment provided by embodiments of the present application may be broadly applied on the Internet. The aforementioned computer terminal 10 provided in the present application may be used to provide a human-machine interface.

Figure 2:
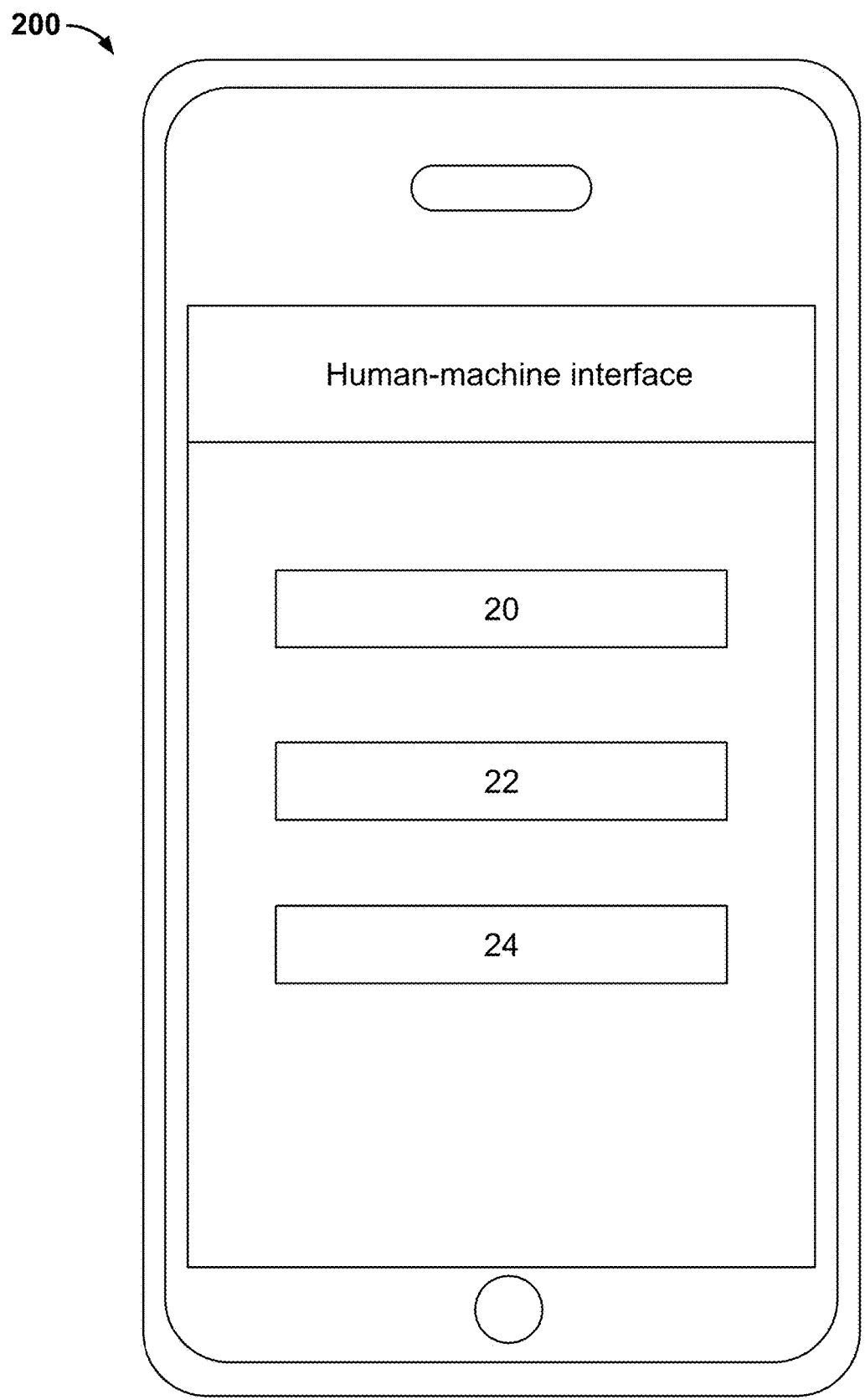
FIG. 2 is a diagram showing an embodiment of a human-machine interface for efficiently processing unread messages.

FIG. 2 is a diagram showing an embodiment of a human-machine interface for efficiently processing unread messages. As shown in FIG. 2, human-machine interface 200 is provided by a mobile device and comprises first control 20, second control 22, and third control 24, First control 20 is configured to present a communication record interface. For example, where an instant communication tool application is executing at the mobile device, the communication record interface presented by first control 20 may comprise a list of dialog boxes corresponding to one or more designated (e.g., chat) objects that the user of the mobile device currently has with other users. Second control 22, which is set on (e.g., overlaps) first control 20, is configured to present the number of all unread messages of a designated object in the communication record interface. In various embodiments, an "unread message" is a message that had been received for the user of the device but for which had been not presented at the device. For example, messages that have been sent to a user using an instant communication tool (e.g., an instant messaging application) since the last time that the user had opened that instant messaging application are "unread messages" with respect to that instant messaging application. Third control 24 is configured to present summary message content that is generated based at least in part on summarizing the message content of the all unread messages corresponding to the designated object.

In some embodiments, human-machine interface 200 may be, but is not limited to, a communication interface. For example, it may be a communication record interface, wherein each of the controls described above packages methods and data. In computer programming, a control may be a graphic user interface element, and the user may modify how the displayed information is displayed. For example, there are view boxes, text boxes, icons, buttons, and other basic visible building blocks. They are contained in application programs and control all data processed by the program, as well as interactive operations concerning this data.

For example, first control 20 may be a text box, a composite box (a text box with a menu or a pull-down menu), a display box, a window, or other type of control. First control 20 may be used to present a communication record interface on the interface described above.

Second control 22 may be a tag, icon, information bar, status bar, or other type of control set on the first control. Second control 22 may be used to present the number of all unread messages of a designated object on the communication record interface. In some embodiments, the designated object includes, but is not limited to, a group chat object or an individual chat object. In some embodiments, a "group chat object" is a chat that the user of the mobile device has with two or more other users. In some embodiments, an "individual chat object" is a chat that the user of the mobile device has with only one other user.

Third control 24 may be a text box, a composite box (a text box with a menu or a pull-down menu), a display box, a window, or other type of control. Third control 24 may be used to present a designated display area corresponding to a designated object. As will be described in further detail below, in some embodiments, the designated display area may present the summarized message content that is generated based on summarizing the message content of the all unread messages corresponding to the designated object. Also, as will be described in further detail below, in some embodiments, the designated display area may present individual unread messages corresponding to the designated object.

In some embodiments, third control 24 may further include at least one of the following example controls: a reply control for the all unread messages, a control for adjusting the unread status of the all unread messages, and a control for evaluating the all unread messages.

As communication technology develops, an ever-growing number of people may choose to use instant communication tools to communicate with others. Moreover, inspired by the fact that communication using instant communication tools has become an integral part of people's habits and thinking, users have enriched office applications to make communication experiences consistent with instant communication tools. They tend to select instant communication tools such as WeChat Work that have the advantages of a familiar communication experience and simplicity and ease of use. It enables employees in an enterprise to use an enterprise-dedicated communication tool easily in a relaxed manner.

Figure 3:
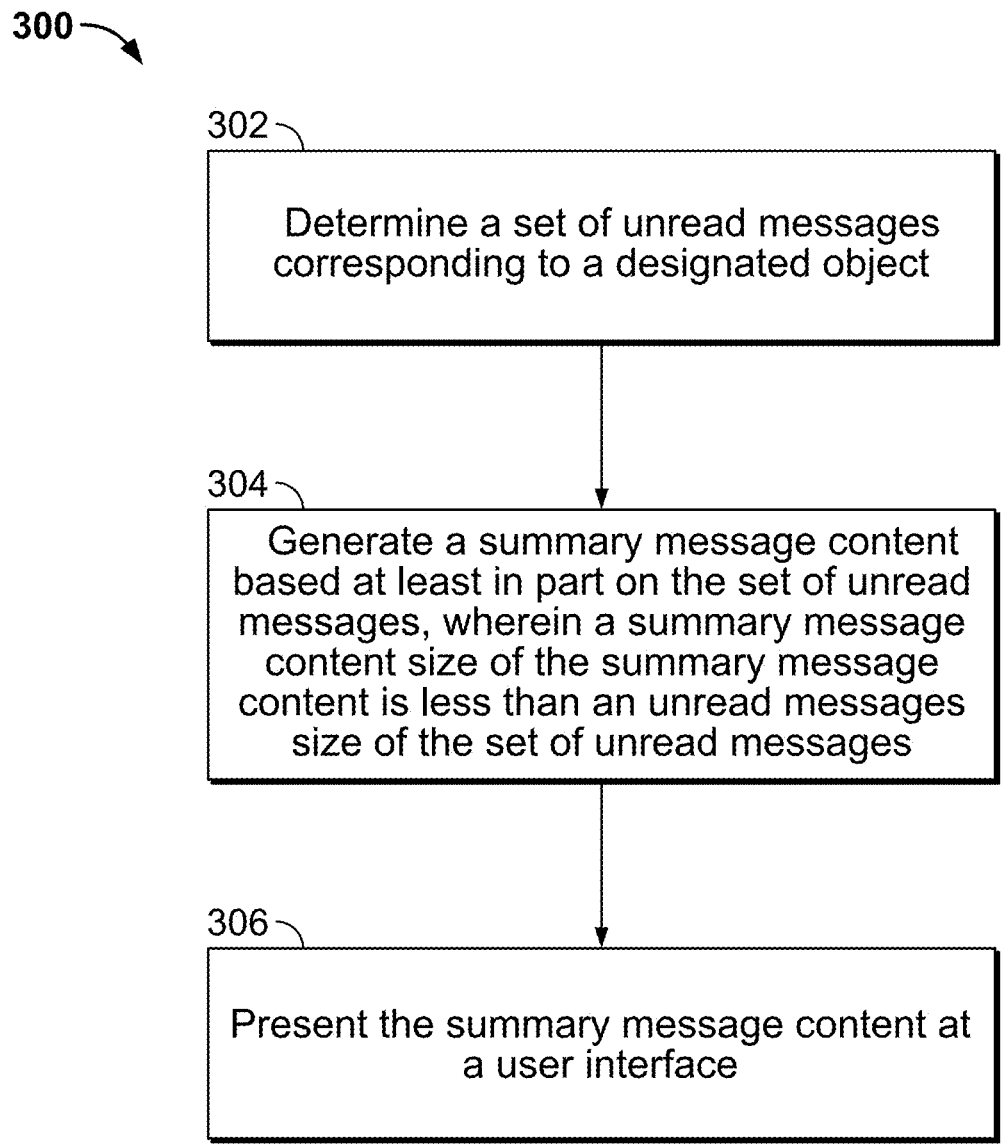
FIG. 3 is a diagram showing an embodiment of a process for efficiently processing unread messages.

FIG. 3 is a diagram showing an embodiment of a process for efficiently processing unread messages. In some embodiments, process 300 is implemented at a computer terminal such as computer terminal 10 of FIG. 1.

Various types of instant communication tools, such as QQ, WeChat, Wangwang, and other instant communication software can be used. As shown in FIG. 3, the unread message display method may be implemented through the steps below:

At 302, a set of unread messages corresponding to a designated object is determined. As mentioned above, a designated object comprises an individual chat object (e.g., a chat between two users) or a group chat object (e.g., a chat among two or more users) associated with an instant communication tool (e.g., an instant messaging platform). Some examples of instant communication tools include QQ, WeChat, and Wangwang.

In some embodiments, the number of unread messages associated with unread messages corresponding to a designated object is determined locally at the computer terminal.

In some embodiments, the number of unread messages associated with unread messages corresponding to a designated object is determined at the server associated with the instant communication tool. In some embodiments, the server is configured to determine the number of all unread messages corresponding to the designated object after receiving a count request sent by a user through the computer terminal. That is, the user may click, tap, or touch a count icon for all unread messages in a human-machine interface provided by the computer terminal, and in response to the user's selection, the user terminal is configured to send the count request to the server.

In various embodiments, a separate number of unread messages is determined for each different designated object. For example, if the user of the computer terminal had two ongoing chats with Alice and Bob and unread messages existed in each of the two chats, then separate numbers of unread messages would be determined for the unread messages in the Alice chat and for the unread messages in the Bob chat.

At 304, a summary message content is generated based at least in part on the set of unread messages, wherein a summary message content size of the summary message content is less than an unread messages size of the set of unread messages.

In some embodiments, the number of unread messages corresponding to a designated object is compared to a preset threshold value, such that only if the number of unread messages corresponding to the designated object greater than the preset threshold value, is a summary message content generated based on the unread messages corresponding to the designated object. For example, the preset threshold value may be a threshold initially generated by the instant communication tool. For example, to raise processing efficiency of the user's unread messages, it may be initially set to "7." However, the user may customize the preset threshold value setting with the instant communication tool. For example, the user may define it under "Settings" in the instant communication tool, changing it to "3," "5," "10," etc. For example, some users have many friends and chat groups and, with the preset threshold value at "7," they still cannot achieve the goal of efficient processing of unread messages. Therefore, they can modify the preset threshold value to a larger value, such as "10" or "15." In addition, if users have fewer ongoing chats and are unlikely to have many unread messages, the users may select to change the preset threshold value to a smaller value, such as "3" or "5." Please note that the above analysis is merely illustrative and is not limited thereto. It should not be understood as specifically limiting the present application.

In various embodiments, all of the unread messages corresponding to a designated object can be analyzed and summarized into a summary message content with NLP technology. Moreover, the size of the summary message content is less than the collective size of all of the unread messages corresponding to a designated object (e.g., the number of bytes of the second message content is less than the combined sizes of each of the unread messages corresponding to a designated object).

At 306, the summary message content is presented at a user interface.

In some embodiments, the summary message content is presented as an interactive element (e.g., window) that at least partially overlays the display of the identification of the designated object at the user interface.

In some embodiments, the summary message content associated with a designated object is presented within a designated display area corresponding to the designated object in a manner that overlaps at least a portion of the communication record interface. In some embodiments, the designated display area is a window that is presented in a manner that is near or overlays at least some of the dialog box corresponding to the designated object. As will be described further below, in addition or alternative to presenting the summary message content, the designated display area corresponding to the designated object may be used to present individual unread messages corresponding to the designated object. Also, as will be described further below, the designated display area may also include one or more controls that are operable to cause additional individual unread messages to be presented and/or cause a single operation to be performed on all of the unread messages corresponding to the designated object.

In some embodiments, if the number of unread messages corresponding to a designated object is greater than a preset threshold value, the top predetermined (e.g., three) number of message-posters that contributed to the unread messages corresponding to the designated object are determined and their corresponding identities may be presented with the summary message content. Surfacing, for the user, the identities of the top contributing users to the total number of unread messages corresponding to a designated object may provide additional context to the user for whom the summary had been generated based on the unread messages.

In some embodiments, if the number of unread messages corresponding to a designated object is less than or equal to a preset threshold value, then it indicates that the current number of all unread messages corresponding to the designated object is not large, and then the individual unread messages themselves, rather than a summary thereof, may be presented at the user interface.

Figure 4A:
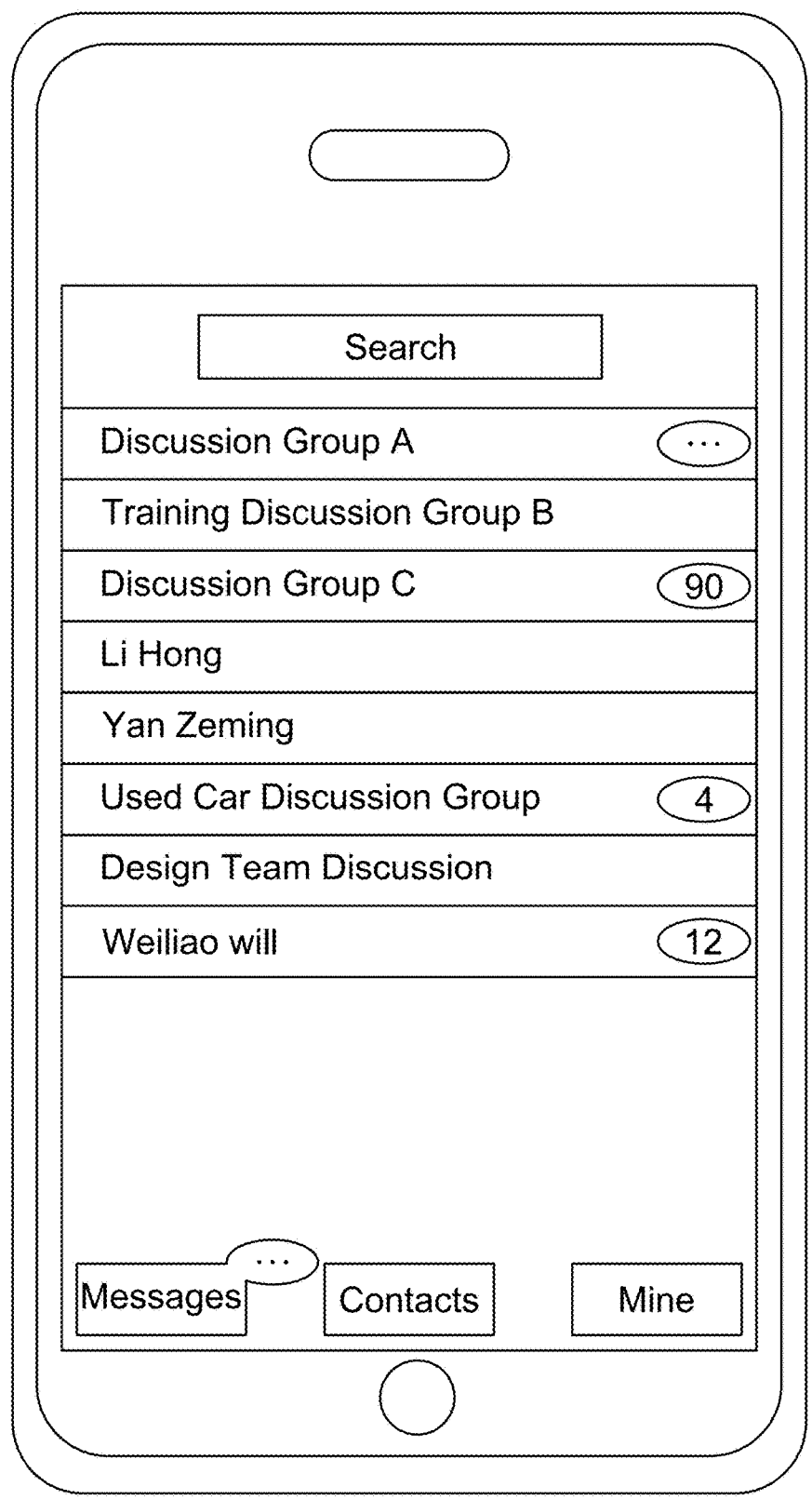
FIG. 4A is a diagram showing an example communication record interface of a user terminal that includes identification information of multiple designated objects.

FIG. 4A is a diagram showing an example communication record interface of a user terminal that includes identification information of multiple designated objects. In the example of the user interface shown in FIG. 4A, communication record interface 400 may be shown after the user logs into (e.g., after submitting the correct credentials) an instant communication tool (e.g., an instant messaging platform). Specifically, communication record interface 400 presents the identification information (e.g., names in dialog boxes) corresponding to group chats such as "Discussion Group A," "Training Discussion Group B," "Discussion Group C," "Used Car Discussion Group," "Li Hong," and "Design Team Discussion," as well as individual chat objects such as "Yan Zeming," and "Weiliao will." In some embodiments, the user may perform an operation (e.g., tap) on a count icon on a location of the communication record interface that corresponds to either a group or individual chat (the oval icons on the right side in FIG. 4A) to trigger a count instruction. In the example of FIG. 4A, after the user terminal receives a count instruction triggered by the user with respect to a particular chat, it sends a count request to the server associated with the instant messaging platform. The server then determines the number of all unread messages of the group chat object or individual chat object to which the count instruction corresponded. As shown in FIG. 4A, if the user wanted to obtain the number of all unread messages in the individual chat object "Weiliao will," the user can tap the oval icon to the right of the "Weiliao will" dialog box in FIG. 4A and then the server may determine "12" as the number of all unread messages corresponding to the "Weiliao will" dialog box, as shown in FIG. 4A. A designated display area where messages may be quickly viewed is also generated. For example, the designated display area may comprise a dialog box that overlaps at least part of the communication record interface. Moreover, in some embodiments, if the number of all unread messages that is acquired is greater than a preset threshold value, NLP technology may be used to summarize the message content of all unread messages corresponding to the selected chat to obtain a summary message content, and the summary message content may be displayed in the "Outline" area of the designated display area shown in the example of FIG. 4B, as will be described below.

In some embodiments, prior to presenting the summary message content in a designated display area of the communication record interface corresponding to the location of the designated object, a user trigger instruction to display the count icon of the all unread messages corresponding to the designated object is received. In response to the user trigger instruction, the designated display area corresponding to the designated object is presented.

Through various embodiments described herein, multiple unread messages that would normally be displayed in a long list of messages at the user interface that the user would likely have scrolled through to read are programmatically condensed into a shorter summary for the user to quickly consume. First, conventionally, all of the unread messages of a chat would need to be sent to the computer terminal in order for the user to consume them. In contrast, according to various embodiments described herein, only a summary of all of the unread messages needs to be sent to the computer terminal for the user to receive an understanding of the messages. Because the summary of the unread messages is smaller in size than the collective size of the unread messages, the summary message content may be sent from the server to the computer terminal faster and thereby, allow the summary message content to be displayed faster at the computer terminal than all of the unread messages could have been displayed at the computer terminal. Second, conventionally, all of the unread messages would have been presented for a user for a particular chat (e.g., in reverse chronological order) and would have potentially occupied most if not all of the display area of the computer terminal (e.g., mobile device). In contrast, various embodiments described herein enable only a summary of such unread messages to be displayed, the presentation of which is likely to occupy much less space on the display area of the computer terminal than the full display of each of the unread messages. As such, various embodiments described herein thereby allow more of the display area of the computer terminal to be freed up to display other content that might be useful to the user.

In some embodiments, the summary message content is presented in a designated display area of the communication record interface corresponding to the location of the designated object. In some embodiments, the designated display area is a display area that overlaps the communication record interface. By presenting the summary message content corresponding to the unread messages of a designated object at a designated display area that corresponds to the location of the designated object at the communication record interface (e.g., user interface), the user's attention is immediately drawn to the summary message content and the user is made aware to which designated object the summary is related.

Figure 4B:
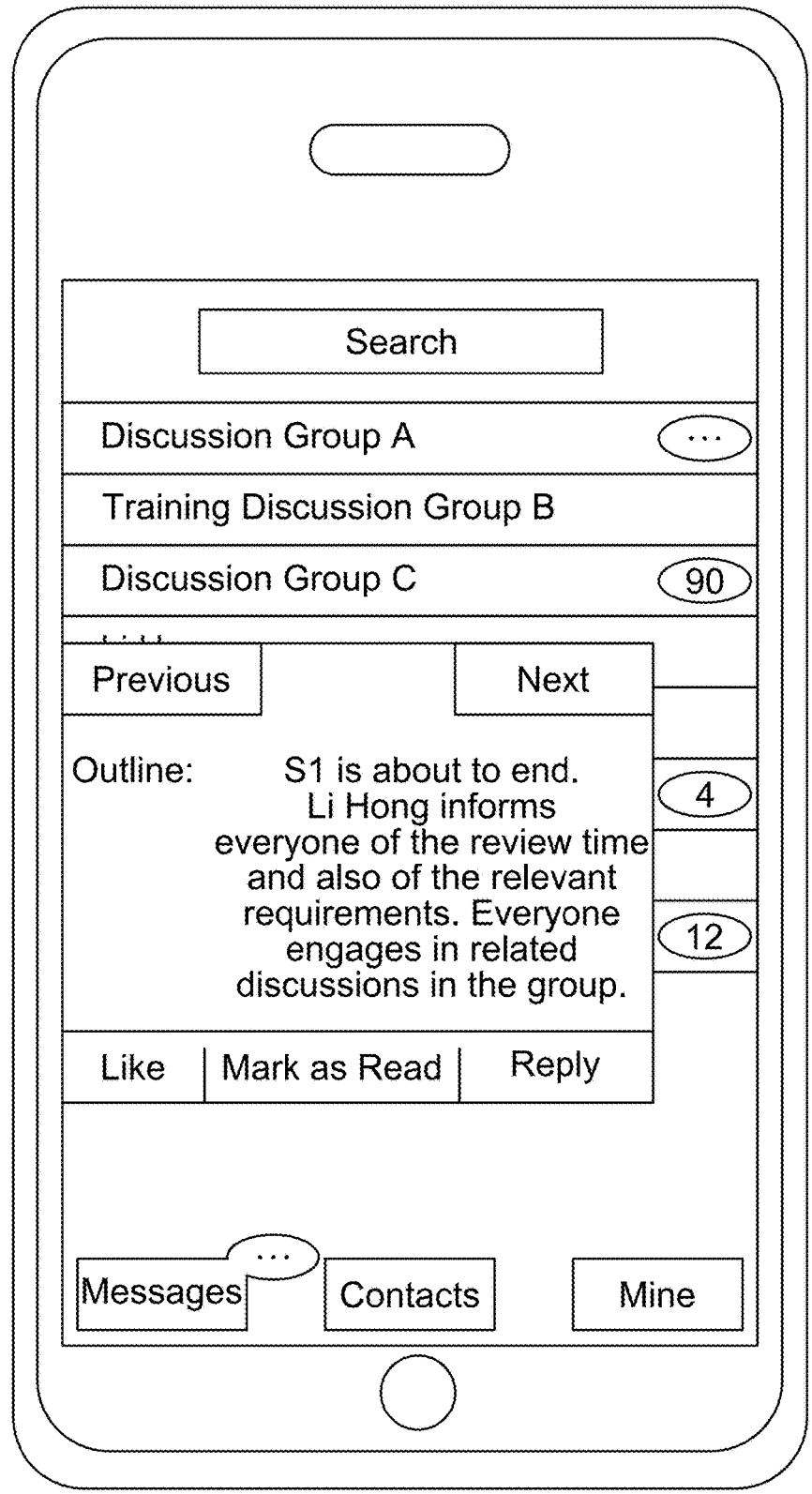
FIG. 4B is a diagram showing an example communication record interface of a user terminal that includes a presented summary message content corresponding to a particular designated object.

FIG. 4B is a diagram showing an example communication record interface of a user terminal that includes a presented summary message content corresponding to a particular designated object. In the example of communication record interface 450, designated display area 452 corresponding to individual chat object "Li Hong" is presented. For example, designated display area 452 was generated based on all of the unread messages corresponding to the individual chat object named "Li Hong." For example, designated display area 452 was generated after the user of the user terminal had performed a user trigger instruction (e.g., a tap operation) with respect to the dialog box corresponding to "Li Hong" and it was determined that the number of unread messages in "Li Hong" exceeded a preset threshold value. Designated display area 452 includes the generated summary message content (which comprises the text: "Outline: Si is about to end. Li Hong informs everyone of the review time and also of the relevant requirements. Everyone engages in related discussions in the group."). Designated display area 452 corresponding to "Li Hong" overlaps at least a portion of communication record interface 450 such that its content can be conspicuously presented and would be efficiently noticed/read by the user.

Figure 5:
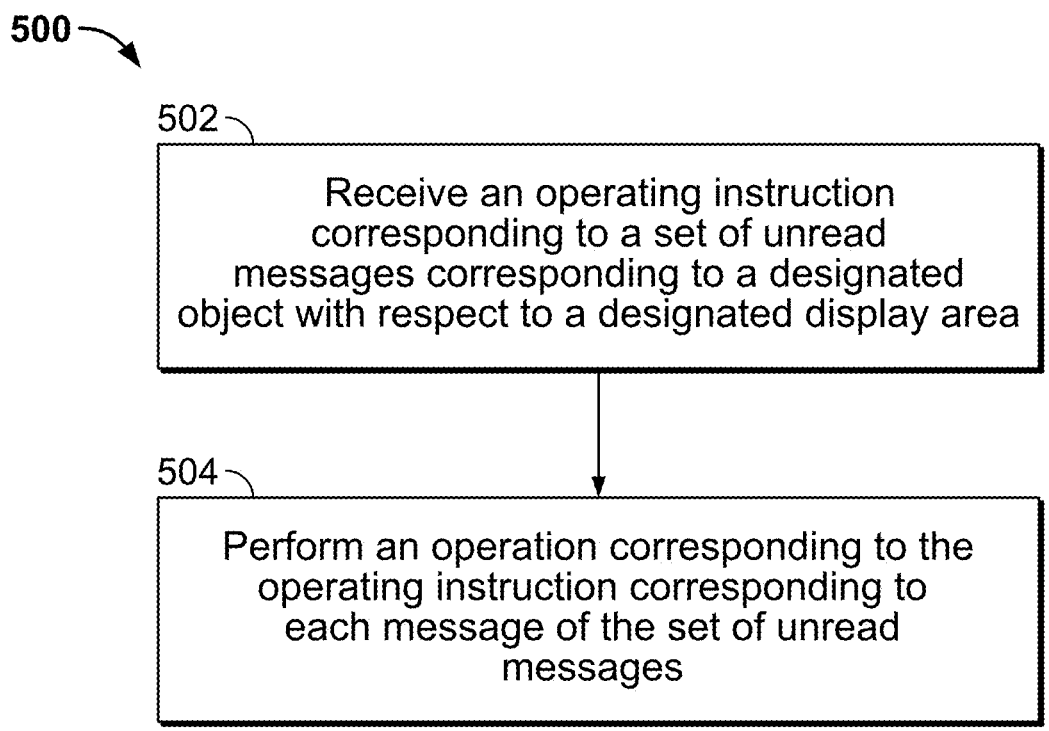
FIG. 5 is a flow diagram showing an example process of performing one operation with respect to all the unread messages corresponding to a designated object.

FIG. 5 is a flow diagram showing an example process of performing one operation with respect to all the unread messages corresponding to a designated object. In some embodiments, process 500 is implemented at a computer terminal such as computer terminal 10 of FIG. 1.

At 502, an operating instruction corresponding to a set of unread messages corresponding to a designated object is received with respect to a designated display area corresponding to the designated object.

At 504, an operation corresponding to the operating instruction is performed corresponding to each message of the set of unread messages.

In some embodiments, a designated display area corresponding to a designated object (e.g., which may or may not include the presentation of a summary message content) includes one or more controls such that upon the user issuing a corresponding operating instruction with respect to any of the control(s), a single corresponding operation is applied to all the unread messages corresponding to the designated object. Some specific examples of the controls include "Reply," "Mark as Read," and "Like." In some embodiments, the user may issue an operating instruction of a control by clicking, tapping, or touching the control within the designated display area.

The following are three example operations that may affect all unread messages and that correspond to controls that may be presented within a designated display area:

1) Replying to the all unread messages. For example, this process may take the form of replying via the designated display area. In another example, after the user terminal receives the operating instruction issued by the user, the dialog page that is configured to present all unread messages is presented and an input box may also be presented within the dialog page so that the user can input a reply message within the input box.

2) Adjusting the unread status or read status of the all unread messages. For example, the unread status of each of the unread messages is changed to a read status. After all the statuses of the unread messages are changed to read statuses, the presentation of the designated display area is closed.

3) Evaluating the all unread messages. For example, a "Like" or other such evaluation status is stored for each of all unread messages.

For example, referring back to FIG. 4B, the "Mark as Read" control/icon shown in designated display area 452 may be tapped, touched, or swiped to adjust the unread status or read status of each of the unread messages corresponding to the "Li Hong" chat object, and the "Like" icon shown in designated display area 452 may be clicked, touched, or swiped to "like" each of the unread messages corresponding to the "Li Hong" chat object.

As described in process 500, a user need only tap, touch, or swipe the various controls presented at a designated display area to quickly issue single operations such as "Like," "Mark as Read," or "Reply" that would affect all of the unread messages, instead of needing to issue a respective operation to each of the unread messages. Therefore, various embodiments described herein enable the shortening of the operating paths whereby the user views unread messages, replies to messages, and "likes" them and as such, makes it convenient for the user to efficiently process multiple unread messages at once.

In some embodiments, in the event that the designated object comprises a group (e.g., chat) object, in which one or more members of the group could have contributed to the total number of unread messages, identifying information corresponding to a predetermined number of message-posting objects (e.g., members) of the group that had contributed to the unread messages is also displayed with the summary message content that is generated based on all of the unread messages. For example, the number of posted messages by a designated message-posting object in the group (e.g., chat) object is displayed in the designated display area. The designated message-posting object may include the message-posting object (e.g., group chat member) with the highest priority level in the group object or the N message-posting objects (e.g., group chat members) with the most posted unread messages in the group object, wherein N is a natural number no less than 1.

In some embodiments, the message-posting object (e.g., group chat member) with the highest priority level may be the group administrator, an executive, or a team leader in the group chat object, but is not limited to these. In some embodiments, the priority levels of message-posting objects (e.g., group chat members) may be determined based on the roles of message-posting objects within an enterprise. For example, if the group object is a group chat, the priority level of the group administrator may be set to the highest level, followed by the enterprise's general manager, assistant managers, and other senior executives and then by regular employees.

Figure 6:
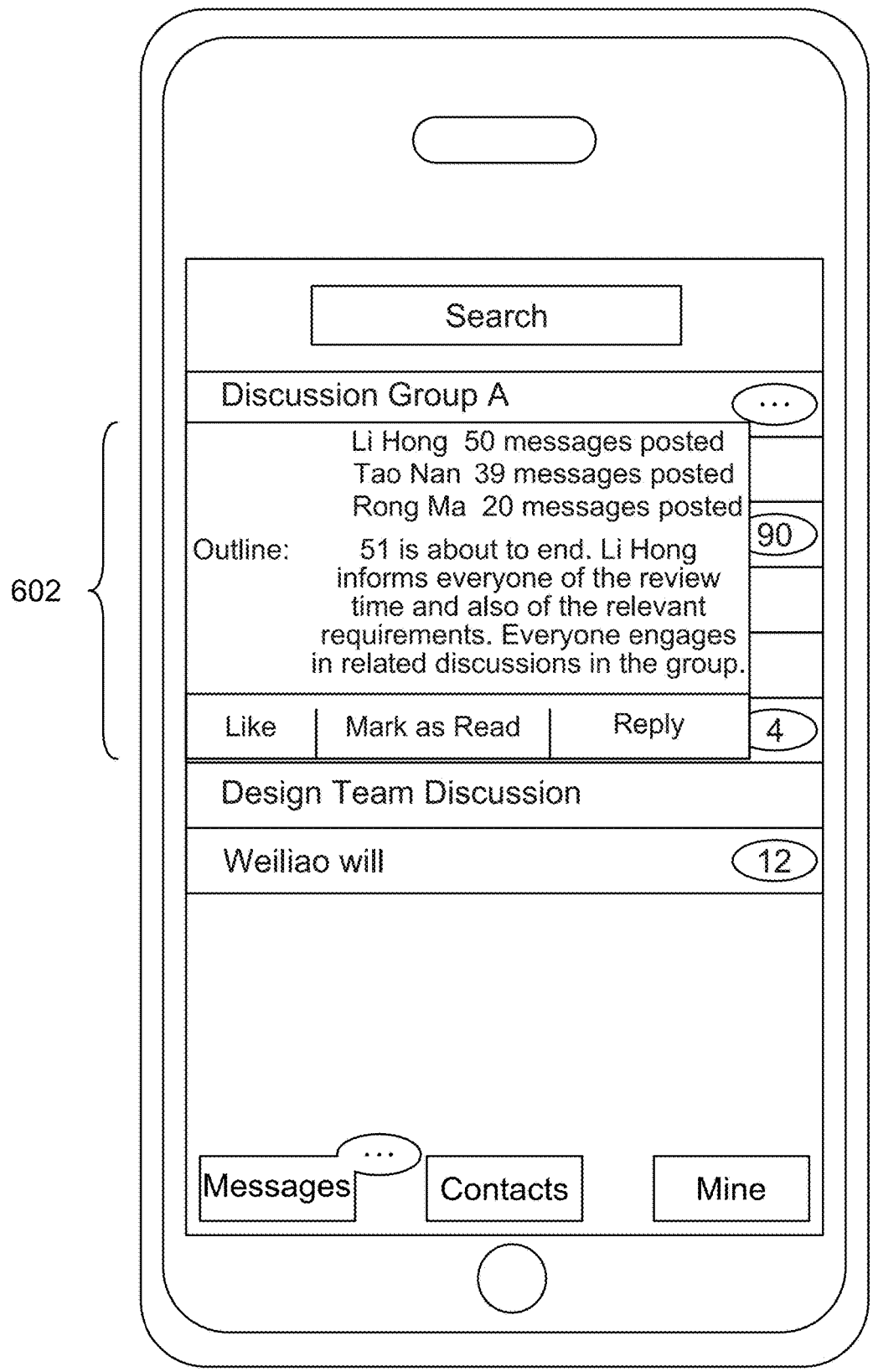
FIG. 6 is a diagram showing an example designated display area corresponding to a group chat object in which identifying information of message-posting objects is presented.

FIG. 6 is a diagram showing an example designated display area corresponding to a group chat object in which identifying information of message-posting objects is presented. As shown in FIG. 6, identifying information corresponding to the three message-posting objects (group chat members) that have contributed the most number of unread messages in group chat object "Discussion Group A" are presented in designated display area 602 corresponding to "Discussion Group A." As shown in designated display area 602, the top three contributing group members are "Li Hong," "Tao Nan," and "Rong Ma," who have respectively contributed 50, 39, and 20 of the total number of unread messages in the "Discussion Group A" group chat object. In this example, the predetermined number of message-posting objects for which identifying information was presented was three but that is merely an example. This way, important features of the total number of unread messages, like which message-posting objects (e.g., group chat member) had contributed to the unread messages, can be extracted and quickly exposed to the user.

In some embodiments, when the number of unread messages corresponding to a designated object is less than or equal to a preset threshold value, at least a portion of the unread messages is presented in the designated display area corresponding to the designated object.

Figure 7:
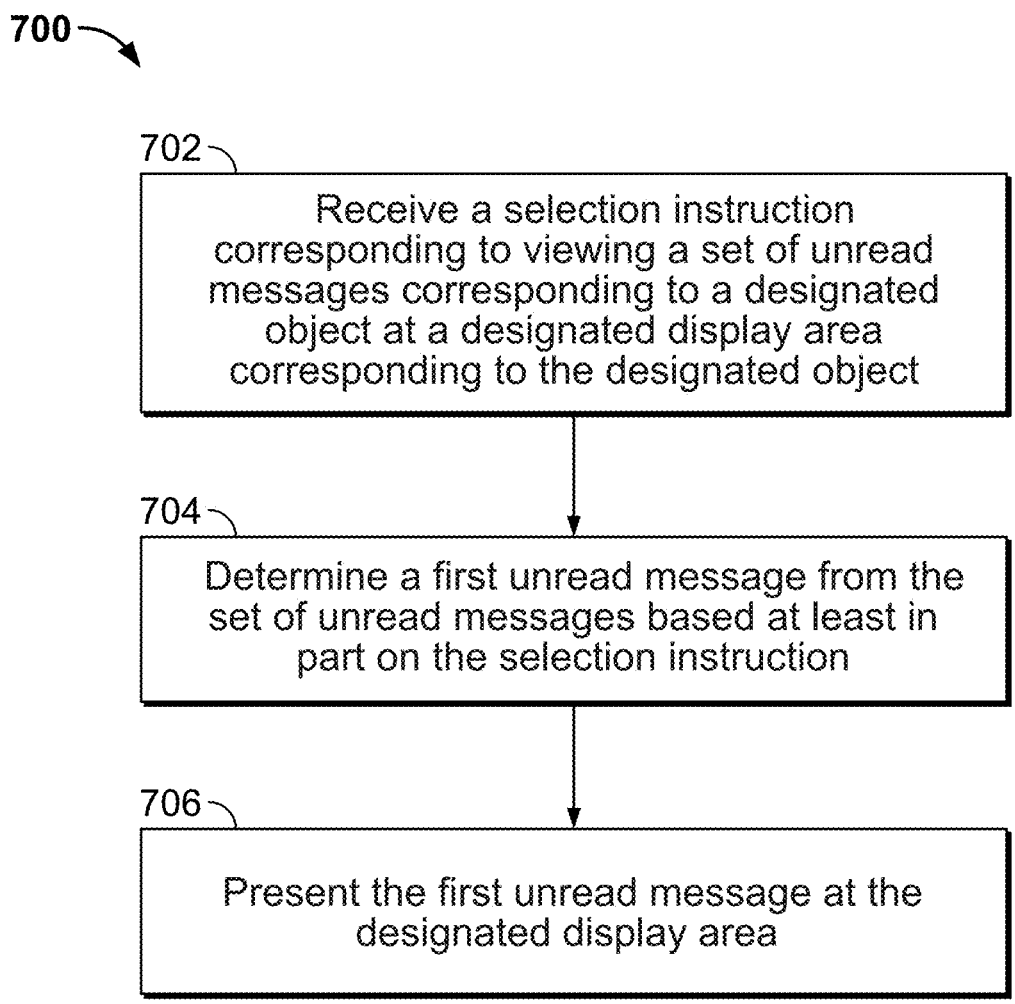
FIG. 7 is a flow diagram showing an example of a process for presenting the unread messages corresponding to a designated object in a designated display area corresponding to the designated object.

FIG. 7 is a flow diagram showing an example of a process for presenting the unread messages corresponding to a designated object in a designated display area corresponding to the designated object. In some embodiments, process 700 is implemented at a computer terminal such as computer terminal 10 of FIG. 1.

At 702, a selection instruction corresponding to viewing a set of unread messages corresponding to a designated object is received at a designated display area corresponding to the designated object. For example, the designated display area corresponding to a designated object had already been generated and presented in response to a user's selection of a dialog box associated with the designated object at the communication interface record. Also, in a first example, the presented designated display area could have been presenting a summary message content that was determined based on all the unread messages corresponding to the designated object (e.g., because the number of unread messages exceeded a preset threshold value). In a second example, the presented designated display area could have been presenting a subset of the unread messages corresponding to the designated object (e.g., because the number of unread messages was less than or equal to the preset threshold value and therefore, a summary message content was not triggered to be generated). The selection instruction corresponds to a control associated with searching/traversing through the set of unread messages. For example, the set of unread messages may be ordered in a sequence based on the times at which the messages were sent by their posters (e.g., sending users). As such, for example, the selection instruction may correspond to either a "Previous" control to cause a predetermined number (e.g., one) of unread messages that are (immediately) earlier in the sequence than the currently presented unread message (if any) to be presented within the designated display area or a "Next" control to cause a predetermined number (e.g., one) of unread messages that are later in the sequence than the currently presented unread message (if any) to be presented within the designated display area.

At 704, a first unread message from the set of unread messages is determined corresponding to the selection instruction. The predetermined number (e.g., one) of unread message(s) of the set of unread messages that corresponds to the selection instruction (e.g., Previous or Next) is determined.

At 706, the first unread message is presented at the designated display area. The determined unread message(s) corresponding to the designated object are presented within the designated display area.

As described by process 700, the user may, in the designated display area, select (e.g., tap or touch) the "Previous" or "Next" icon on the designated display area to switch between viewing the content of multiple unread messages so that the user efficiently processes unread messages in the process of using the instant messaging tool.

Figure 8:
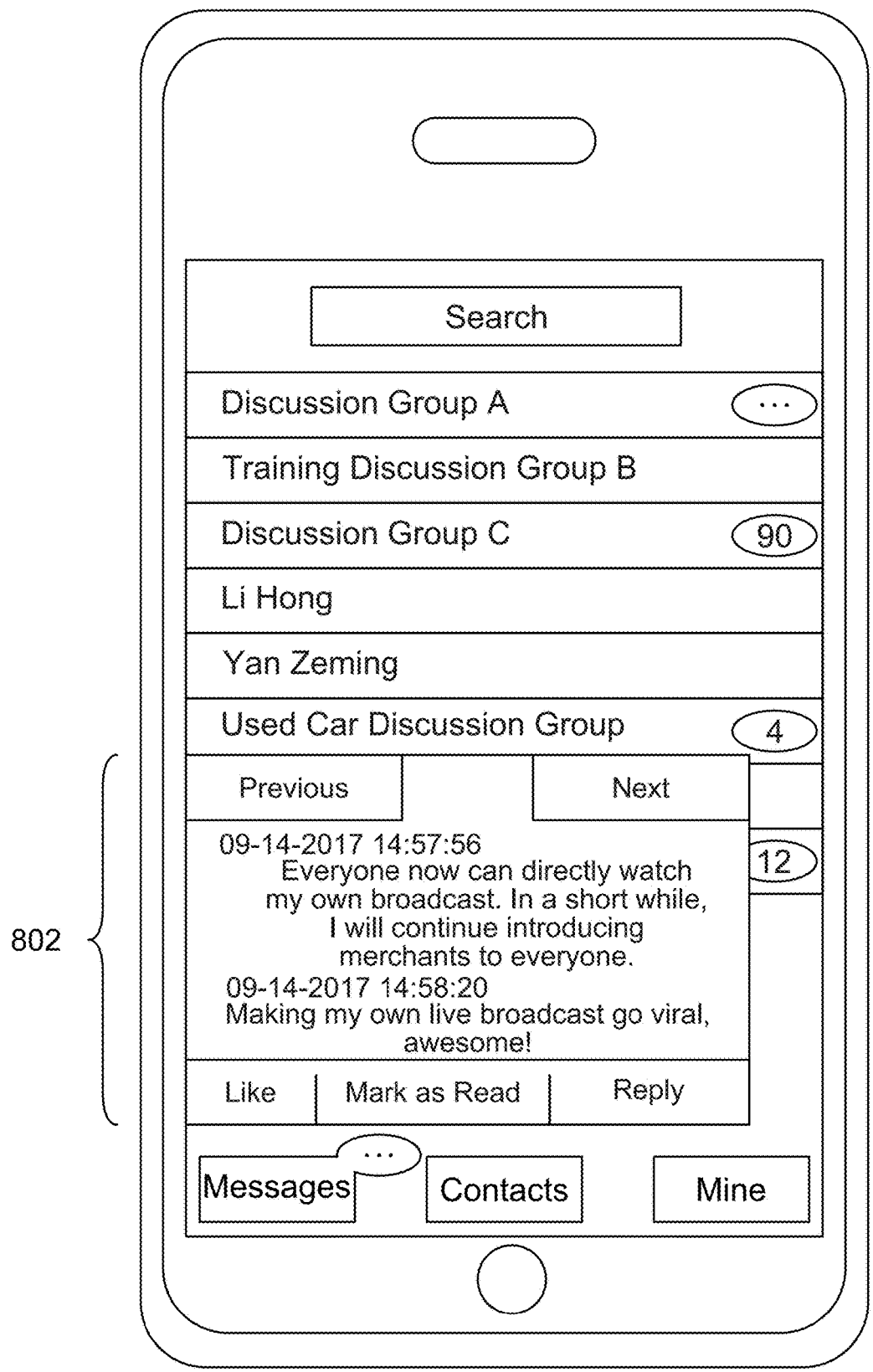
FIG. 8 is a diagram showing an example designated display area corresponding to a designated object in which the unread messages corresponding to the designated object can be viewed.

FIG. 8 is a diagram showing an example designated display area corresponding to a designated object in which the unread messages corresponding to the designated object can be viewed. Designated display area 802 corresponding to designated object group chat "Used Car Discussion Group" presents two of the four unread messages of that group. Each of the unread messages that is presented at designated display area 802 is shown with a corresponding timestamp at which they were sent or received for the user of the user terminal that is shown in FIG. 8. To view additional unread messages from the four unread messages (e.g., that is ordered in a sequence based on the chronological order in which they were sent or received), the user may select the "Previous" or "Next" controls in designated display area 802 to view the previous or next predetermined number of unread messages.

For example, designated display area 802 could be presenting the message content of unread messages corresponding to a designated object after displaying a summary message content that was generated based on all of the unread messages corresponding to the designated object. For example, when designated display area 802 was presenting the summary message content, the user could have selected either the "Previous" or "Next" controls to start viewing the individual unread messages on which the summary message content was based.

In some embodiments, after the designated display area corresponding to a designated object has been presented at the communication interface record, if the user selects an area outside of the designated display area corresponding to the designated object on the communication interface record, then the designated display area corresponding to the designated object is closed/dismissed. For example, after the user terminal receives a tap or click instruction by the user in another area of the communication record interface, the designated display area corresponding to the designated object is closed/dismissed.

Figure 9:
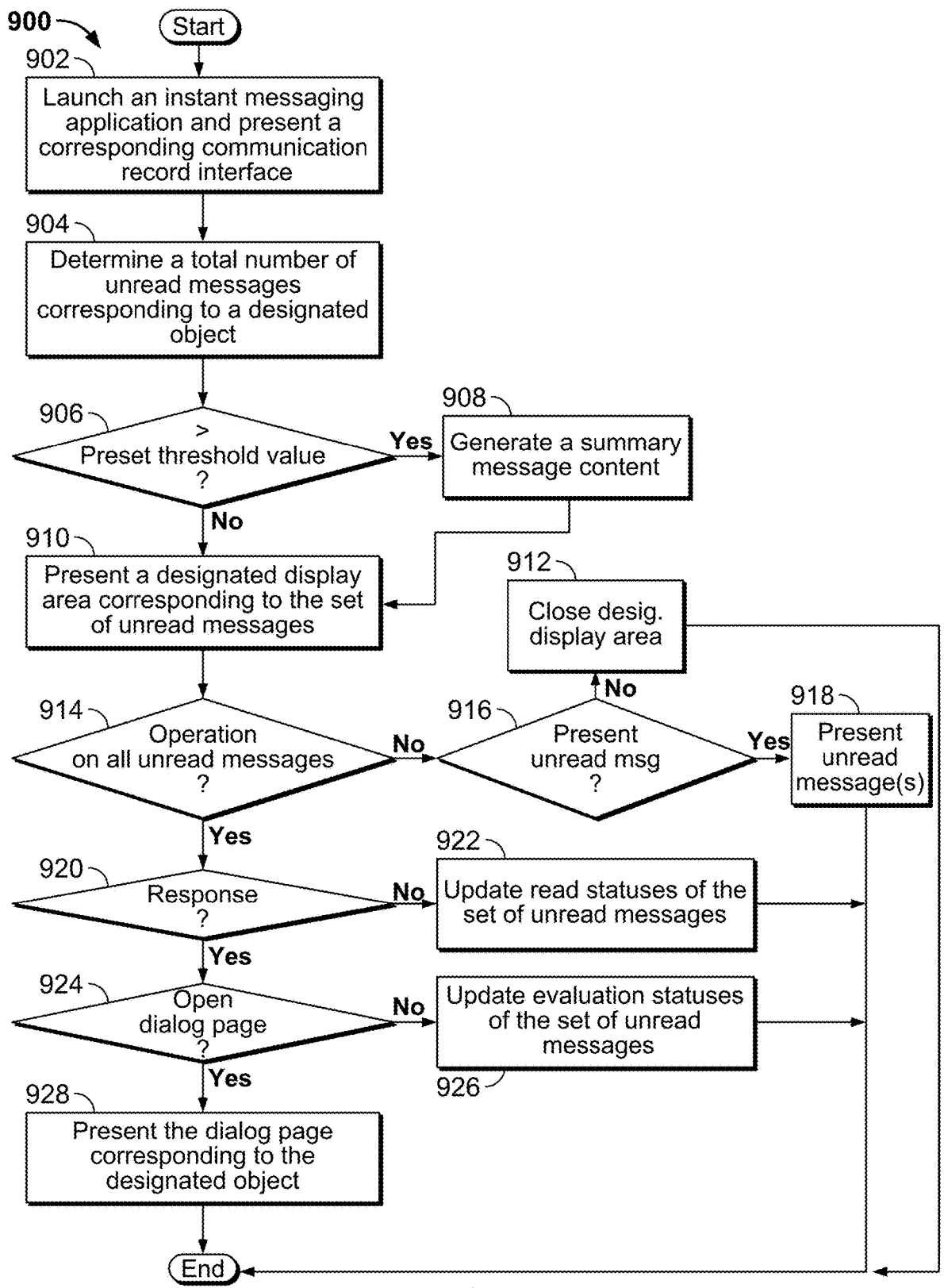
FIG. 9 is a flow diagram showing an example of a process for presenting unread messages corresponding to a designated object.

FIG. 9 is a flow diagram showing an example of a process for presenting unread messages corresponding to a designated object. In some embodiments, process 900 is implemented at a computer terminal such as computer terminal 10 of FIG. 1.

At 902, an instant messaging application is launched and a corresponding communication record interface is presented.

Specifically, the instant message application may be, but is not limited to, an instant communication tool on a computer terminal (e.g., user terminal), such as QQ, WeChat, or Wangwang. The communication record interface may be a message list interface in the instant messaging application and may be presented in the form of the interface displayed in FIGS. 4A, 4B, 6, and 8, but is not limited thereto.

For example, the user terminal may be a smart phone (e.g., an Android phone or an iOS phone), a tablet computer (e.g., an iPad), a computer, or other terminal device.

At 904, a total number of unread messages corresponding to a designated object is determined.

For example, the designated object may include, but is not limited to, a group chat object or an individual chat object that is maintained by the instant messaging application.

In some embodiments, step 904 may be performed in response to a user's operation of selecting (e.g., clicking, tapping, or touching) a count icon on the communication record interface to trigger a count instruction for the designated object. In some embodiments, after the user terminal receives a count instruction triggered by the user, it sends a count request to the server. The server then acquires the number of all unread messages of the group chat object or individual chat object and then sends the determined number back to the user terminal. In some embodiments, the user terminal then presents the number of unread messages corresponding to the designated object at the communication record interface.

At 906, whether the number of unread messages exceeds a preset threshold value is determined. In the event that the number of unread messages exceeds the preset threshold value, control is transferred to 908. Otherwise, in the event that the number of unread messages is less than or equal to the preset threshold value, control is transferred to 910.

The number of unread messages may be compared to the preset threshold value, and, when the number is greater than the preset threshold value, the message content of all of the unread messages is summarized to obtain a summary message content at 908. The summary message content is then displayed in a designated display area corresponding to the designated object at the communication record interface. In a specific example, the designated display area is a viewing dialog box for content related to the all unread messages. In some embodiments, the summary message content may be generated by summarizing each of the unread messages' content with NLP technology. Moreover, the number of bytes of the summary message content is less than the collective size content of the entire set of unread messages.

The number of unread messages may be compared to the preset threshold value, and, when the number is less than or equal to the preset threshold value, a summary of the unread messages is not generated. Instead, at least a subset of the unread messages is presented directly within the designated display area corresponding to the designated object at the communication record interface.

At 910, a designated display area corresponding to the set of unread messages of the designated object is presented.

As mentioned above, if a summary message content was generated at 908 because the total number of unread messages is greater than the preset threshold value, then the designated display area corresponding to the designated object presents the summary content message. However, if a summary message content was not generated at 908 because the total number of unread messages is less than or equal to the preset threshold value, then the designated display area corresponding to the designated object presents instead at least a subset of the set of unread messages. For example, if the unread messages are ordered chronologically, a predetermined number (e.g., two) of the unread messages that are the first in the ordered sequence (e.g., the two oldest messages) can be initially presented within the designed display area.

At 914, whether an operation is to be performed on all of the unread messages is determined. In the event that an operation is to be performed on all of the unread messages, control is transferred to 920. Otherwise, in the event that an operation is not to be performed on all of the unread messages, control is transferred to 916.

As mentioned above, in some embodiments, the designated display area may present one or more controls that a user can select to cause a corresponding operation to be applied to each unread message in the set of unread messages. Examples of such controls include replying to the all unread messages (e.g., "Reply"), adjusting the unread status or read status ("Mark as Read" or Mark as Unread"), and evaluating the unread messages (e.g., "Like"), as will be described below.

At 916, whether unread message(s) are to be presented is determined. In the event that unread message(s) are to be presented, control is transferred to 918. Otherwise, in the event that unread message(s) are not to be presented, control is transferred to 912.

For example, unread message(s) are not to be presented if a user closes the designated display area (e.g., by selecting on an area of the communication record interface that is outside of the designated display area).

At 912, the designated display area is closed. For example, if the user selects (e.g., taps, touches, or clicks) on an area of the communication record interface that is outside of the designated display area, then the designated display area is dismissed.

At 918, unread messages are presented. For example, a predetermined number (e.g., two) of the ordered sequence of unread messages are presented within the designated display area at a time. The user may select a "Previous" or "Next" control that is presented within the designated display area to cause other unread messages in the ordered sequence to be presented within the designated display area.

At 920, whether a response should be generated for the set of unread messages is determined. In the event that a response should be generated for the set of unread messages, control is transferred to 924. Otherwise, in the event that a response should not be generated for the set of unread messages, control is transferred to 922.

At 922, read statuses of the set of unread messages are updated.

If the user does not select the "Reply" or the "Like" controls on the designated display area and instead selects the "Mark as Read" control, then the read status of each of the unread messages is changed from "Unread" to "Read." Moreover, after the "Mark as Read" control is selected, the designated display area is dismissed, and the count icon on the designated object is also no longer presented.

At 924, whether a dialog page corresponding to the designated object should be opened is determined. In the event that the dialog page corresponding to the designated object should be opened, control is transferred to 928. Otherwise, in the event that the dialog page corresponding to the designated object should not be opened, control is transferred to 926.

If the user selects the "Reply" control on the designated display area, then the dialog page corresponding to the designated object is presented at the user terminal. In some embodiments, the dialog page corresponding to the designated object presents at least a subset of all the messages that are associated with the designated object. In some embodiments, the messages are ordered by chronological order and the newest messages, including at least some of the unread messages corresponding to the designated object, are presented within the dialog page. In some embodiments, the dialog page also includes an input box in which the user of the user terminal can input a reply message to the other message poster(s)/user(s) of the designated object. In some embodiments, prior to presenting the dialog page, the designated display area is first dismissed.

At 928, the dialog page corresponding to the designated object is presented.

At 926, evaluation statuses of the set of unread messages is updated.

If the user does not select the "Reply" or "Mark as Read" controls on the designated display area and instead selects the "Like" control, then the evaluation status of each of the unread messages is changed from "No Status" to "Like." Moreover, after the "Like" control is selected, the designated display area is dismissed. In some embodiments, after the "Like" control is selected, the next time that the dialog page corresponding to the designated object is presented, each of the set of messages that had been unread when the "Like" control was selected by the user is presented in a manner to indicate that the user had "liked" each of those messages.

As such, process 900 describes the example ways in which various embodiments described herein allow unread messages to be efficiently consumed, by programmatically generating a summary thereof, when appropriate, and/or by enabling operations to be performed with respect to each unread message from a set of unread messages at once.

Through descriptions of the above implementations, persons skilled in the art can clearly understand that methods based on the above embodiments may be realized through software with the necessary general-use hardware platform. Of course, hardware may also be used, but in many cases the former is the preferred implementation. Based on such an understanding, the technical solution of the present application, whether intrinsically or with respect to portions that contribute to the prior art, is realizable in the form of software products. These computer software products can be stored on storage media (such as ROM/RAM, magnetic disks, and optical disks) and include a certain number of instructions used to cause a piece of terminal equipment (which could be a mobile telephone, a computer, a server, or network equipment) to execute the methods described in the embodiments of the present application.

Figure 10:
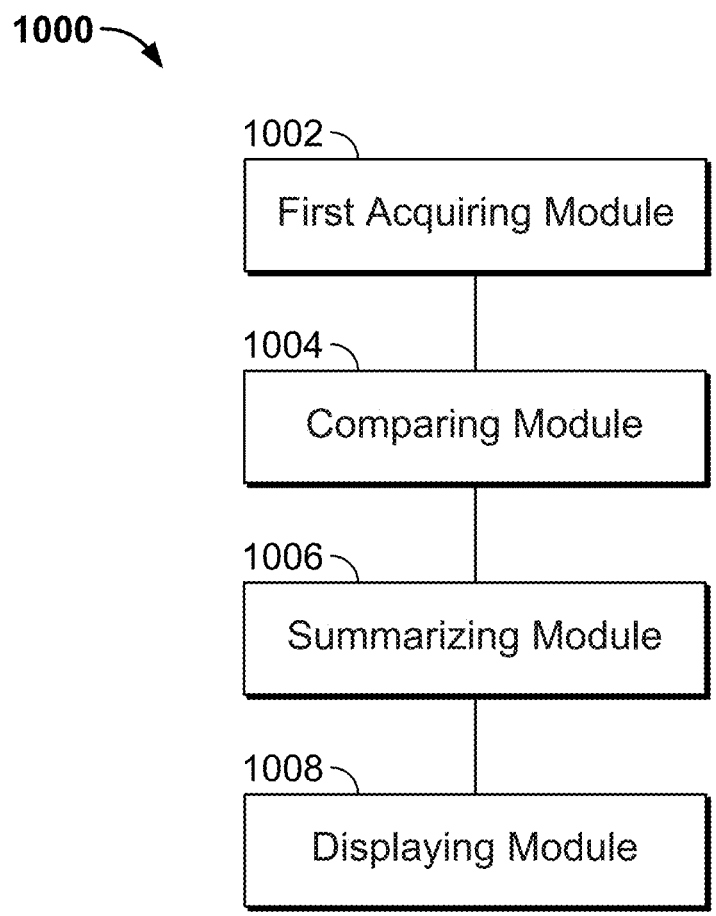
FIG. 10 is a diagram showing an embodiment of a system for efficiently processing unread messages.

FIG. 10 is a diagram showing an embodiment of a system for efficiently processing unread messages. As shown in FIG. 10, system 1000 includes first acquiring module 1002, comparing module 1004, summarizing module 1006, and displaying module 1008.

The modules and sub-modules described above can be implemented as software components executing on one or more processors, as hardware such as programmable logic devices, and/or as Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

First acquiring module 1002 is configured to obtain the number of all unread messages corresponding to a designated object. Comparing module 1004 is configured to compare the number to a preset threshold value. Summarizing module 1006 is configured to summarize the message content of the all unread messages (e.g., when the number is greater than the preset threshold value to generate a summary message content). The number of bytes of the second message content is less than that of the collective number of bytes of all of the unread messages. Displaying module 1008 is configured to present the summary message content.

Figure 11:
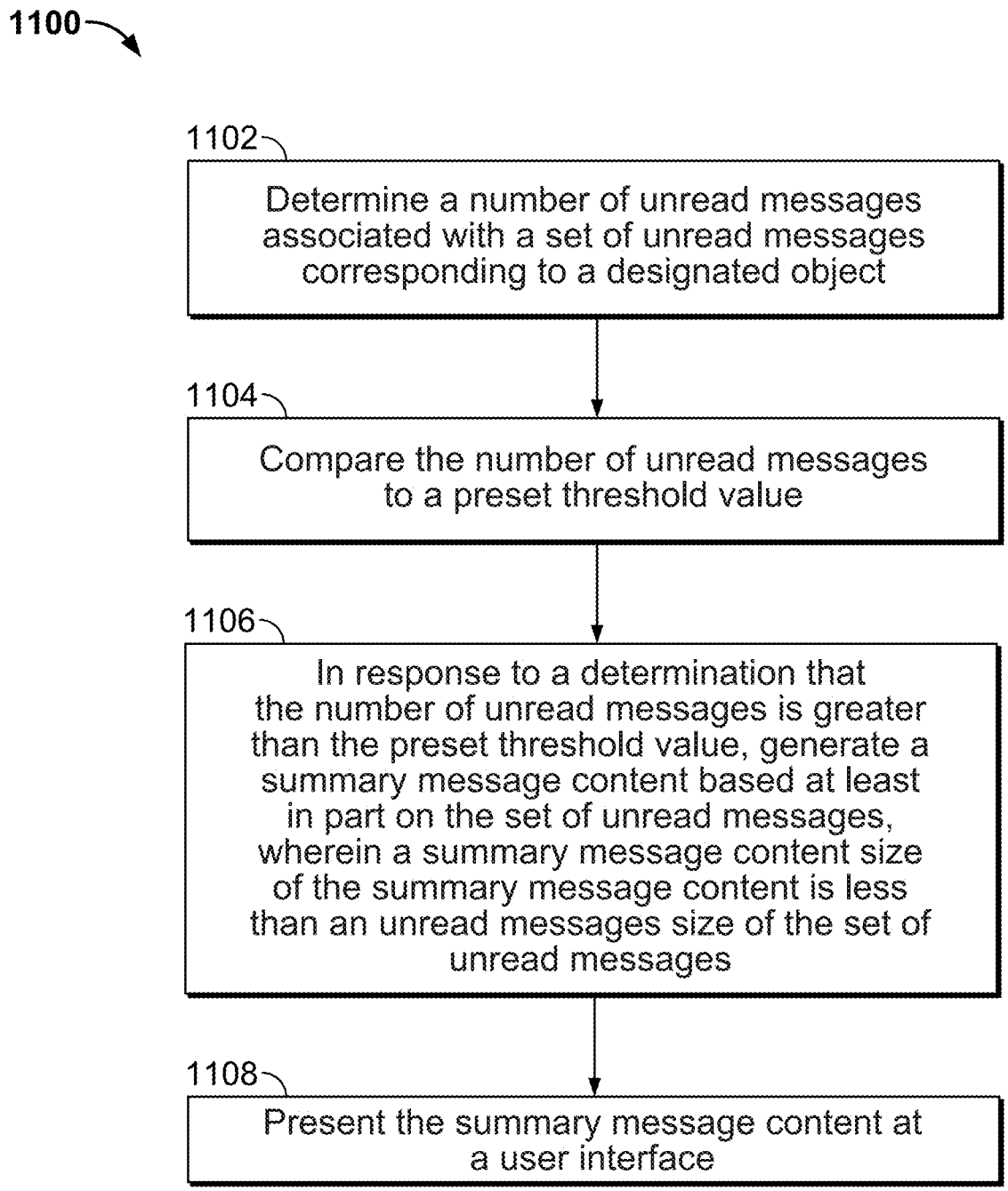
FIG. 11 is a flow diagram showing an embodiment of a process for efficient processing of unread messages.

FIG. 11 is a flow diagram showing an embodiment of a process for efficient processing of unread messages. In some embodiments, process 1100 is implemented at a computer terminal such as computer terminal 10 of FIG. 1.

Process 1100 may be applied on, but is not limited to, various types of instant communication tools, such as, for example, QQ, WeChat, Wangwang, and other instant communication software.

Process 1100 determines whether the number of unread messages exceeds a preset threshold value before generating a summary message content based on the unread messages.

At 1102, a number of unread messages associated with a set of unread messages corresponding to a designated object is determined.

As mentioned above, a designated object is an individual chat object or a group chat object that is maintained by an instant communication tool (e.g., an instant messaging application). Each unread message is a message that has not been viewed by the user operating the computer terminal (e.g., a user terminal).

In some embodiments, a server associated with the instant communication tool may determine unread messages associated with the designated object after receiving a count request sent by a user through the computer terminal. That is, the user may click, tap, or touch a count icon for all unread messages in a human-machine interface provided by the user terminal, and the user terminal then sends the count request to the server. The user terminal may be a smart phone (e.g., an Android phone or an iOS phone), a tablet computer (e.g., an iPad), a computer, or other terminal device.

In some embodiments, a server may also automatically determine the number of unread messages corresponding to a designated object without a count request that is issued by the user. For example, a server may automatically determine the current number of unread messages at multiple preset time points or after one or more set intervals of time.

At 1104, the number of unread messages is compared to a preset threshold value.

At 1106, in response to a determination that the number of unread messages is greater than the preset threshold value, a summary message content is generated based at least in part on the set of unread messages, wherein a summary message content size of the summary message content is less than an unread messages size of the set of unread messages.

When the number of the unread messages is greater than a preset threshold value, it is presumed that the current number of all unread messages is relatively large or that many users in the group chat object are actively participating in posting messages. It is then desirable to use NLP technology to summarize all of the unread messages corresponding to the designated object to obtain a summary message content.

In various embodiments, the number of bytes of the summarized message content is less than that of the unread message content.

In some embodiments, the top predetermined (e.g., three) number of message-posters that contributed to the unread messages corresponding to the designated object are determined and their corresponding identities may be presented with the summary message content. This feature could inform the user of the user terminal further context of the unread messages by providing the identities of the top contributors of the messages.

In some embodiments, when the number of the unread messages is less than or equal to the preset threshold value, then the original content of all unread messages may be presented at the user terminal without generating a summary based on the unread messages.

At 1108, the summary message content is presented at a user interface.

In some embodiments, the summary message content is presented in a designated display area corresponding to the designated object.

According to various embodiments described herein, unread messages in an instant messaging tool can be efficiently processed and presented to the user to save the user time in consuming unread messages.

Process 500 of FIG. 5 above may be applied to the set of unread messages described with process 1100 to cause a user selected operating instruction to apply an operation (e.g., a "Reply," "Like," or "Mark as Read") to all of the unread messages at once.

Figure 12:
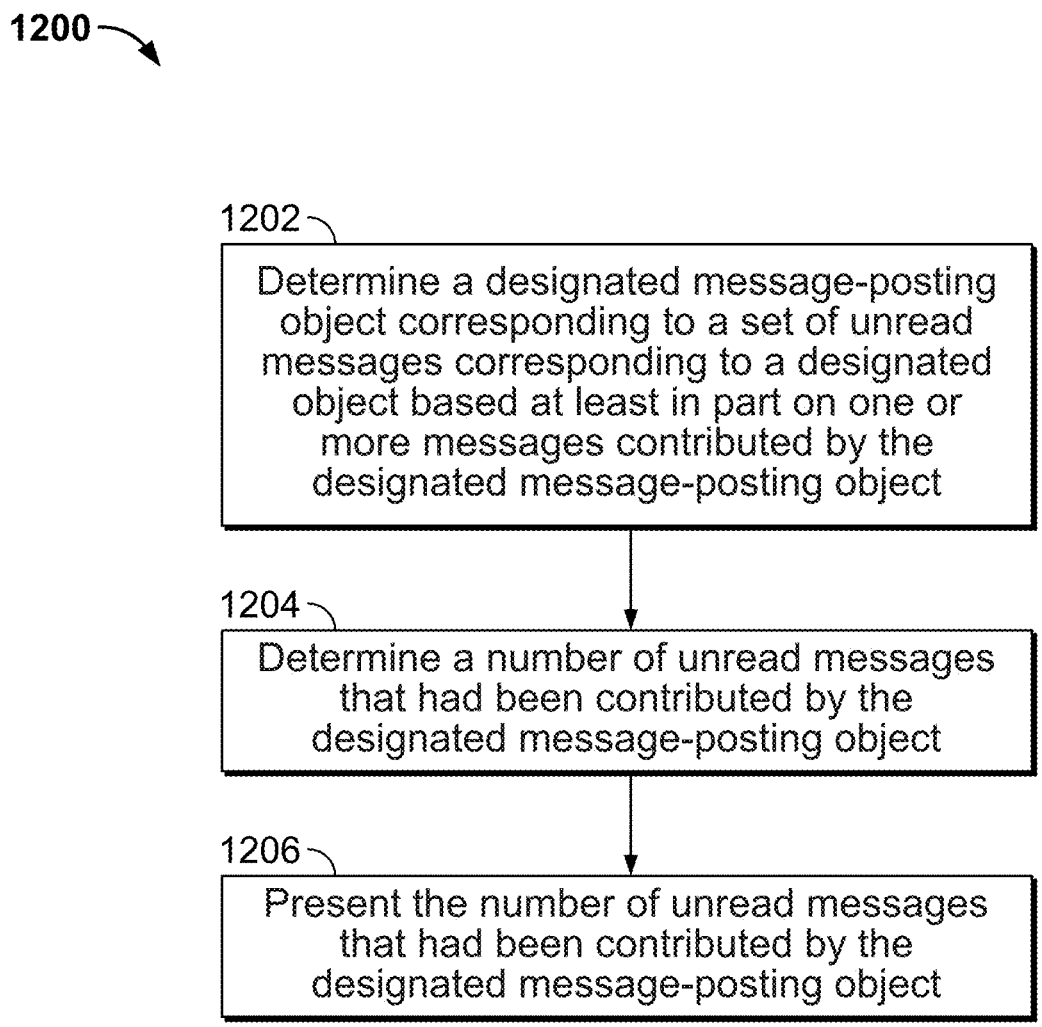
FIG. 12 is a flow diagram showing an example process for presenting the number of unread messages posted by a designated message-posting object.

FIG. 12 is a flow diagram showing an example process for presenting the number of unread messages posted by a designated message-posting object. In some embodiments, process 1200 is implemented at a computer terminal such as computer terminal 10 of FIG. 1.

For example, process 1200 may be performed after process 1100 of FIG. 11 is performed. Process 1200 may be used to identify the message-posting object associated with a designated object that had significantly contributed to the unread messages associated with the designated object.

At 1202, a designated message-posting object corresponding to a set of unread messages corresponding to a designated object is determined based at least in part on one or more messages contributed by the designated message-posting object.

In various embodiments, where the designated object comprises a group chat object maintained by an instant communication tool, each member user of the group chat object is referred to as a "message-posting object." In some embodiments, each member user (or message-posting object) may be assigned a corresponding priority level (e.g., based on their role within an enterprise). In some embodiments, a message-posting object who is the group administrator, an executive, or a team leader in the group chat object, for example, is assigned the highest priority level of the group chat object. For example, if the current group chat object is a business group chat, the priority level of the group administrator may be set to the highest level, followed by the enterprise's general manager, assistant managers, and other senior executives and then by ordinary users.

In some embodiments, the predetermined number of message-posting object(s) with the highest priority level(s) among the message-posting object(s) that had sent/posted/contributed messages in the current set of unread messages corresponding to a designated object are determined as the "designated message-posting object(s)."

In some other embodiments, the predetermined number of message-posting object(s) that sent/posted/contributed the most number of unread messages among the message-posting object(s) that had sent/posted/contributed messages in the current set of unread messages corresponding to a designated object are determined as the "designated message-posting object(s)."

At 1204, a number of unread messages that had been contributed by the designated message-posting object is determined.

At 1206, the number of unread messages that had been contributed by the designated message-posting object is presented.

In some embodiments, the number of messages posted by each of the designated message-posting objects is presented in an icon or a corner mark to that user.

For example, the number of messages that have been contributed by each message-posting object to the current set of unread messages is counted and the top three message-posting objects with the most unread messages are ranked. Then, the respective identifying information of the ranked three top message-posting objects are presented in the designated display area corresponding to the designated object.

Figure 13:
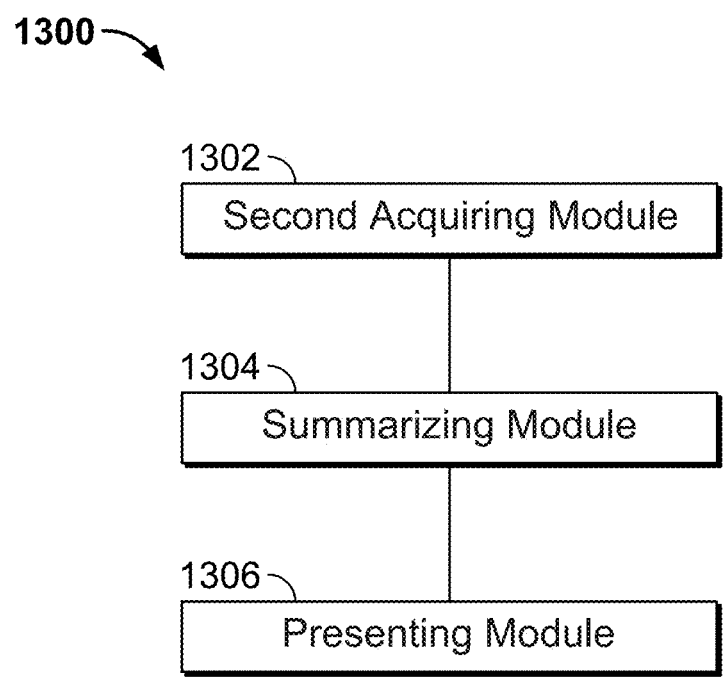
FIG. 13 is a diagram showing an embodiment of a system for efficiently processing unread messages.

FIG. 13 is a diagram showing an embodiment of a system for efficiently processing unread messages. As shown in FIG. 13, system 1300 includes seconding acquiring module 1302, summarizing module 1304, and presenting module 1306.

Second acquiring module 1302 is configured to determine a number of unread messages associated with a set of unread messages corresponding to a designated object.

Summarizing module 1304 is configured to generate a summary message content based at least in part on the set of unread messages in response to a determination that the number of unread messages is greater than the preset threshold value. The summary message content size of the summary content is less than an unread messages size of the set of unread messages.

Presenting module 1306 is configured to present the summary message content at a user interface.

In some embodiments, the present application may provide a terminal. The terminal may be any computer terminal device in a group of terminals. In some embodiments, the terminal may be a terminal device such as a mobile terminal.

In some embodiments, the terminal may be located on at least one network device among multiple network devices of a computer network.

In some embodiments, the computer terminal may be located on at least one network device among multiple network devices of a computer network.

In some embodiments, the terminal comprises: a processor to determine a set of unread messages corresponding to a designated object, generate a summary message content based at least in part on the set of unread messages, wherein the number of bytes of the second message content is less than that of the first message content; a display means to present the summary message content at a user interface.

As shown in FIG. 1, above the computer terminal may comprise: one or more processors, memory, and a transmission means.

The memory may be used to store software programs and modules, e.g., program instructions/modules corresponding to the secure unread message display method and means in an embodiment of the present application. By running software programs and modules stored in the memory, the processor executes various function apps and data processing, i.e., it implements the unread message display method. The memory may comprise high-speed random access memory. It may further comprise non-volatile memory, such as one or more magnetic storage devices, flash memory, or other non-volatile solid-state memory. In some embodiments, the memory may further comprise memory that is remotely disposed relative to the processor. Such remote memory may be connected to the terminal via a network. Examples of the network described above include, but are not limited to, the Internet, corporate intranets, local area networks, mobile communication networks, and combinations thereof.

In the present embodiment, the computer terminal can execute program code for the following steps in an unread message display method of an application: determining a set of unread messages corresponding to a designated object, generating a summary message content based at least in part on the set of unread messages, wherein the number of bytes of the second message content is less than that of the first message content, and presenting the summary message content at a user interface.

The processor may, via a transmission means, call information and applications stored in the memory to execute the steps below: determining a set of unread messages corresponding to a designated object, generating a summary message content based at least in part on the set of unread messages, wherein the number of bytes of the second message content is less than that of the first message content, and presenting the summary message content at a user interface.

In some embodiments, the processor may further execute program code for the step below: displaying the summary message content in a designated display area of the communication record interface where the designated object is located, wherein the designated display area is a display area overlapping the communication record interface.

In some embodiments, the processor may further execute program code for the steps below: receiving an operating instruction corresponding to a set of unread messages corresponding to a designated object with respect to a designated display area; and performing an operation corresponding to the operating instruction corresponding to each message of the set of unread messages.

In some embodiments, the processor may further execute program code for the steps below: replying to the all unread messages, adjusting the unread status or read status of the all unread messages, and evaluating the all unread messages.

In some embodiments, the processor may further execute program code for the step below: receiving a user trigger instruction for the count icon of the all unread messages, wherein the trigger instruction is for triggering display of the designated display area.

In some embodiments, the processor may further execute program code for the step below: displaying the number of posted messages that had been contributed by a designated message-posting object in the group object in the designated display area. In some embodiments, the designated message-posting object comprises the message-posting object with the highest priority level in the group object or the N message-posting objects with the most posted messages in the group object, wherein N is a natural number no less than 1.

In some embodiments, the processor may further execute program code for the step below: displaying the unread messages corresponding to the designated object in the designated display area when the number of the unread messages is less than a preset threshold value.

In some embodiments, the processor may further execute program code for the steps below: receiving in the designated display area a selection instruction for viewing the unread messages corresponding to the designated object;

and determining, in accordance with the selection instruction, message content associated with a first unread message to present in the designated display area.

In some embodiments, the processor may further execute program code for the steps below: receiving a selection instruction from the user for another area in the communication record interface other than the designated display area on the communication record interface; and in response to the selection instruction, closing the designated display area.

In some embodiments, the computer terminal may further execute program code for the following steps in an unread message display method of an application: determining a number of unread messages associated with a set of unread messages corresponding to a designated object; comparing the number of unread messages to a preset threshold value; in response to a determination that the number of unread messages is greater than the preset threshold value, generating a summary message content based at least in part on the set of unread messages; and presenting the summary message content at a user interface.

In some embodiments, the processor may further execute program code for the step below: displaying the summary message content in a designated display area of the communication record interface where a designated object is located, wherein the designated display area is a display area overlapping the communication record interface.

In some embodiments, the processor may further execute program code for the steps below: receiving an operating instruction corresponding to a set of unread messages corresponding to a designated object with respect to a designated display area; and performing an operation corresponding to the operating instruction corresponding to each message of the set of unread messages.

In some embodiments, the processor may further execute program code for the steps below: determining the designated message-posting object corresponding to a set of unread messages corresponding to a designated object based at least in part on one or more messages contributed by the designated message-posting object; determining a number of unread messages that had been contributed by the designated message-posting object; and presenting the number of unread messages that had been contributed by the designated message-posting object.

Persons skilled in the art can understand that the structure shown in FIG. 1 is merely illustrative. The computer terminal could also be a smart phone (such as an Android phone or an iOS phone), a tablet computer, a palmtop computer, a mobile Internet device (MID), a PAD, or another terminal device. FIG. 1 does not impose restrictions on the structures of the electronic devices described above. For example, the computer terminal 10 may further comprise more or fewer components (such as network interfaces and display devices) than are shown in FIG. 1 or have a configuration different from the one shown in FIG. 1.

Persons with ordinary skill in the art can understand that all or some of the steps in the various methods of the embodiments described above may be completed by using programs to instruct computer terminal-related hardware. The programs may be stored in computer-readable storage media, and the storage media may comprise flash drives, read-only memory (ROM), random access memory (RAM), magnetic disks, or optical disks.

An embodiment of the present application provides a storage medium. Optionally, in the present embodiment, the storage medium may be used to save the program code executed by the unread message display techniques described above.

In some embodiments, the storage medium may be located on any computer within a computer terminal group in a computer network or on any mobile terminal within a mobile terminal group.

In some embodiments, a storage medium may be set up to store program code for executing the steps below: determining a set of unread messages corresponding to a designated object, generating a summary message content based at least in part on the set of unread messages, wherein the number of bytes of the second message content is less than that of the first message content, and presenting the summary message content at a user interface.

In some embodiments, the storage medium may further be set up to store program code for executing the step below: displaying the summary message content in a designated display area of the communication record interface where the designated object is located, wherein the designated display area is a display area overlapping the communication record interface.

In some embodiments, the storage medium may further be set up to store program code for executing the steps below: receiving an operating instruction corresponding to a set of unread messages corresponding to a designated object with respect to a designated display area; and performing an operation corresponding to the operating instruction corresponding to each message of the set of unread messages.

In some embodiments, the storage medium may further be set up to store program code for executing the steps below: replying to the all unread messages, adjusting the unread status or read status of the all unread messages, and evaluating the all unread messages.

In some embodiments, the storage medium may further be set up to store program code for executing the step below: receiving a user trigger instruction for the count icon of the all unread messages, wherein the trigger instruction is for triggering display of the designated display area.

In some embodiments, the storage medium may further be set up to store program code for executing the step below: displaying the number of posted messages of a designated message-posting object in the group object in the designated display area, wherein the designated message-posting object comprises the message-posting object with the highest priority level in the group object or the N message-posting objects with the most posted messages in the group object, wherein N is a natural number no less than 1.

In some embodiments, the storage medium may further be set up to store program code for executing the step below: displaying the first message content in the designated display area when the number is less than a preset threshold value.

In some embodiments, the storage medium may further be set up to store program code for executing the steps below: receiving in the designated display area a selection instruction for viewing the unread messages corresponding to the designated object; and determining, in accordance with the selection instruction, message content associated with a first unread message to present in the designated display area.

In some embodiments, the storage medium may further be set up to store program code for executing the steps below: receiving a selection instruction from the user for another area in the communication record interface other than the designated display area on the communication record interface; and in response to the selection instruction, closing the designated display area.

In some embodiments, a storage medium may be set up to store program code for executing the following steps: determining a number of unread messages associated with a set of unread messages corresponding to a designated object; comparing the number of unread messages to a preset threshold value; in response to a determination that the number of unread messages is greater than the preset threshold value, generating a summary message content based at least in part on the set of unread messages; and presenting the summary message content at a user interface.

In some embodiments, the storage medium may further be set up to store program code for executing the step below: displaying the summary message content in a designated display area of the communication record interface where a designated object is located, wherein the designated display area is a display area overlapping the communication record interface.

In some embodiments, the storage medium may further be set up to store program code for executing the steps below: receiving an operating instruction corresponding to a set of unread messages corresponding to a designated object with respect to a designated display area; and performing an operation corresponding to the operating instruction corresponding to each message of the set of unread messages.

In some embodiments, the storage medium may further be set up to store program code for executing the steps below: determining the designated message-posting object corresponding to a set of unread messages corresponding to a designated object based at least in part on one or more messages contributed by the designated message-posting object; determining a number of unread messages that had been contributed by the designated message-posting object; and presenting the number of unread messages that had been contributed by the designated message-posting object.

The sequential numbers of the embodiments described above are merely descriptive and do not represent the relative superiority or inferiority of the embodiments.

In the embodiments described above, the description of each embodiment has its respective emphasis, and parts of an embodiment are not described in detail. One may refer to other embodiments for the relevant descriptions.

Please understand that, in several embodiments provided by the present application, the disclosed technical content may be implemented in other ways. The means embodiments described above are merely illustrative. For example, the division into the units is merely a division by logical function. When actually implemented, there may be other forms of division. For example, multiple units or components may be combined or integrated into another system, or some features might be omitted or not executed. Also, couplings or direct couplings or communication connections between things that are displayed or discussed may be through some interfaces. Indirect couplings or communication connections between units or modules may be electrical or otherwise.

Units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

In addition, each functional unit in each of the embodiments of the present application may be integrated into a processing unit, or each unit may have an independent physical existence. Or two or more units may be integrated into one unit. The integrated units described above may be implemented in the form of hardware, or they may be implemented in the form of software functional units.

If the integrated units are implemented in the form of software functional units and are sold or used as independent products, they may be stored in computer-readable media. With such an understanding, it becomes clear that the technical schemes of the present application, whether intrinsically or those portions that contribute to the prior art, or all or part of the technical schemes, may be embodied in the form of software products. These computer software products are stored in a storage medium and comprise some instructions for causing a computer device (which could be a personal computer, a server, or a network device) to execute all or some of the steps in the methods described by the various embodiments of the present application. The storage medium described above encompasses: USB flash drives, read-only memory (ROM), random access memory (RAM), mobile hard drives, magnetic or optical disks, or various other media that can store program code.

The above are merely preferred embodiments of the present application. Please note that persons with ordinary skill in the art could also make certain improvements and embellishments and that these improvements and embellishments should also be regarded as being within the protective scope of the present application, so long as they do not depart from the principles of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising;
one or more processors configured to:
    determine a set of unread messages corresponding to a designated object, wherein the designated object is presented at a communication record interface comprising a list of dialog boxes corresponding to one or more designated objects;
    determine a first count of unread messages included in the set of unread messages;
    determine whether the first count of unread messages is greater than a preset threshold value, wherein the preset threshold value is customizable;
    in response to a determination that the first count of unread messages is greater than the preset threshold value, generate a summary message content based at least in part on the set of unread messages, wherein a summary message content size of the summary message content is less than an unread messages size of the set of unread messages;
    present the summary message content in a designated display area at a user interface, wherein the designated display area at least partially overlaps the communication record interface, wherein to present the summary message content includes to:
        determine a designated message-posting object corresponding to the set of unread messages based at least in part on one or more messages contributed by the designated message-posting object, wherein the designated message-posting object comprises a message-posting object with the highest priority level in the designated object or N message posting objects with the most posted unread messages in the designated object, wherein N is a natural number no less than 1;

determine a subset of the set of unread messages that had been contributed by the designated message-posting object; and present, in the designated display area, a second count associated with the subset of the set of unread messages that had been contributed by the designated message-posting object along with identifying information associated with the designated message-posting object; and present, in the designated display area, a control with the summary message content at the user interface, wherein the control is operable to cause a single operation to be performed on each unread message of a plurality of unread messages from the set of unread messages corresponding to the designated object; and one or more memories coupled to the one or more processors and configured to provide instructions to the one or more processors.

2. The system of claim 1, wherein the one or more processors are configured to:

receive a count instruction with respect to the designated object;

in response to the count instruction, determine the first count of unread messages associated with the set of unread messages; and present the first count of unread messages corresponding to the designated object.

3. The system of claim 1, wherein the one or more processors are configured to:

query a server to determine the first count of unread messages associated with the set of unread messages;

receive the first count of unread messages; and present the first count of unread messages corresponding to the designated object.

4. The system of claim 1, wherein the one or more processors are further configured to:

receive a selection instruction corresponding to the control presented with the summary message content.

5. The system of claim 1, wherein the designated message-posting object is determined based at least in part on a priority level associated with the designated message-posting object.

6. The system of claim 1, wherein the designated message-posting object is determined based at least in part on the second count of unread messages that had been contributed by the designated message-posting object.

7. The system of claim 1, wherein the one or more processors are further configured to:

receive a selection instruction corresponding to viewing the set of unread messages at the designated display area corresponding to the designated object;

determine a first unread message from the set of unread messages based at least in part on the selection instruction; and present the first unread message at the designated display area.

8. The system of claim 7, wherein the set of unread messages is ordered in a sequence, and wherein the first unread message is further determined based at least in part on the first unread message's position in the sequence.

9. The system of claim 1, wherein the single operation comprises to adjust read statuses of messages in the plurality of unread messages and wherein to perform the single operation comprises the one or more processors being configured to adjust a respective read status of each message of the plurality of unread messages.

10. The system of claim 1, wherein the single operation comprises to evaluate to the plurality of unread messages and wherein to perform the single operation comprises the one or more processors being configured to store a respective evaluation status for each message of the plurality of unread messages.

11. The system of claim 1, wherein the single operation comprises to reply to the plurality of unread messages and wherein to perform the single operation comprises the one or more processors being configured to present a dialog page corresponding to the designated object.

12. The system of claim 1, wherein the designated message-posting object is determined based at least in part on a priority level associated with the designated message-posting object, wherein the priority level of the designated message-posting object is determined based on the designated message-posting object's role within an enterprise.

13. The system of claim 12, wherein the designated message-posting object's role within the enterprise comprises one or more of the following: a group administrator, an executive, a team leader, and a manager.

14. A method, comprising:

determining a set of unread messages corresponding to a designated object, wherein the designated object is presented at a communication record interface comprising a list of dialog boxes corresponding to one or more designated objects;

determining a first count of unread messages associated with the set of unread messages;

determining whether the first count of unread messages is greater than a preset threshold value, wherein the preset threshold value is customizable;

in response to a determination that the first count of unread messages is greater than the preset threshold value, generating a summary message content based at least in part on the set of unread messages, wherein a summary message content size of the summary message content is less than an unread messages size of the set of unread messages;

presenting the summary message content in a designated display area at a user interface, wherein the designated display area at least partially overlaps the communication record interface, wherein presenting the summary message content includes:

determining a designated message-posting object corresponding to the set of unread messages based at least in part on one or more messages contributed by the designated message-posting object, wherein the designated message-posting object comprises a message-posting object with the highest priority level in the designated object or N message posting objects with the most posted unread messages in the designated object, wherein N is a natural number no less than 1;

determining a subset of the set of unread messages that had been contributed by the designated message-posting object; and presenting, in the designated display area, a second count associated with the subset of the set of unread messages that had been contributed by the designated message-posting object along with identifying information associated with the designated message-posting object; and presenting, in the designated display area, a control with the summary message content at the user interface, wherein the control is operable to cause a single operation to be performed on each unread message of a plurality of unread messages from the set of unread messages corresponding to the designated object.

15. The method of claim 14, further comprising presenting the designated display area corresponding to the designated object.

16. The method of claim 15, further comprising:
receiving a selection instruction corresponding to the control presented with the summary message content.

17. A computer program product, the computer program product being embodied in a non-transitory computer-readable storage medium and comprising computer instructions for:
determining a set of unread messages corresponding to a designated object, wherein the designated object is presented at a communication record interface comprising a list of dialog boxes corresponding to one or more designated objects;
determining a first count of unread messages associated with the set of unread messages;
determining whether the first count of unread messages is greater than a preset threshold value, wherein the preset threshold value is customizable;
in response to a determination that the first count of unread messages is greater than the preset threshold value, generating a summary message content based at least in part on the set of unread messages, wherein a summary message content size of the summary message content is less than an unread messages size of the set of unread messages;
presenting the summary message content in a designated display area at a user interface, wherein the designated display area at least partially overlaps the communication record interface, wherein presenting the summary message content includes:
determining a designated message-posting object corresponding to the set of unread messages based at least in part on one or more messages contributed by the designated message-posting object, wherein the designated message-posting object comprises a message-posting object with the highest priority level in the designated object or N message posting objects with the most posted unread messages in the designated object, wherein N is a natural number no less than 1;
determining a subset of the set of unread messages that had been contributed by the designated message-posting object; and
presenting, in the designated display area, a second count associated with the subset of the set of unread messages that had been contributed by the designated message-posting object along with identifying information associated with the designated message-posting object; and
presenting, in the designated display area, a control with the summary message content at the user interface, wherein the control is operable to cause a single operation to be performed on each unread message of a plurality of unread messages from the set of unread messages corresponding to the designated object.

* * * * *